US011126866B2

(12) United States Patent
Schubert et al.

(10) Patent No.: US 11,126,866 B2
(45) Date of Patent: *Sep. 21, 2021

(54) SYSTEMS AND METHODS FOR DETERMINING PATH CONFIDENCE FOR UNMANNED VEHICLES

(71) Applicant: WING AVIATION LLC, Mountain View, CA (US)

(72) Inventors: Martin Schubert, Mountain View, CA (US); Philip Watson, Felton, CA (US); Michael Grundmann, San Jose, CA (US); Gabriella Levine, San Francisco, CA (US)

(73) Assignee: Wing Aviation LLC, Mountain View, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/842,003

(22) Filed: Apr. 7, 2020

(65) Prior Publication Data

US 2020/0234064 A1    Jul. 23, 2020

Related U.S. Application Data

(63) Continuation of application No. 15/667,391, filed on Aug. 2, 2017, now Pat. No. 10,621,448.

(51) Int. Cl.
*G06K 9/00* (2006.01)
*B62D 1/28* (2006.01)
(Continued)

(52) U.S. Cl.
CPC ...... *G06K 9/00798* (2013.01); *B60K 31/0008* (2013.01); *B62D 1/28* (2013.01);
(Continued)

(58) Field of Classification Search
CPC .. G06K 9/00798; B62D 15/025; B62D 1/283; B62D 1/28; G01C 21/3484; G01C 21/20;
(Continued)

(56) References Cited

U.S. PATENT DOCUMENTS 6,488,979 B1    12/2002    Davila et al.
7,353,110 B2     4/2008    Kim
(Continued)

FOREIGN PATENT DOCUMENTS

| WO | WO-0073815 A1 * | 12/2000 | ............ G01S 19/47 |
| WO | 2016/183525 A1 | 11/2016 | |
| WO | WO2016/183525 | 11/2016 | |

OTHER PUBLICATIONS

Office Action dated Aug. 13, 2020, in corresponding Australian application No. 2018311700, filed Jul. 24, 2018, 4 pages.
(Continued)

*Primary Examiner* — Marthe Y Marc-Coleman
(74) *Attorney, Agent, or Firm* — Christensen O'Connor Johnson Kindness PLLC

(57) ABSTRACT

Examples implementations relate to determining path confidence for a vehicle. An example method includes receiving a request for a vehicle to navigate a target location. The method further includes determining a navigation path for the vehicle to traverse a first segment of the target location based on a plurality of prior navigation paths previously determined for traversal of segments similar to the first segment of the target location. The method also includes determining a confidence level associated with the navigation path. Based on the determined confidence level, the method additionally includes selecting a navigation mode for the vehicle from a plurality of navigation modes corresponding to a plurality of levels of remote assistance. The method further includes causing the vehicle to traverse the
(Continued)

first segment of the target location using a level of remote assistance corresponding to the selected navigation mode for the vehicle.

20 Claims, 14 Drawing Sheets

(51) Int. Cl.
| | |
|---|---|
| G05D 1/00 | (2006.01) |
| B60K 31/00 | (2006.01) |
| G05D 1/02 | (2020.01) |
| B62D 15/02 | (2006.01) |
| G01C 21/34 | (2006.01) |
| G06N 3/04 | (2006.01) |
| G01C 21/20 | (2006.01) |
| G08G 1/16 | (2006.01) |

(52) U.S. Cl.
CPC ........... *B62D 1/283* (2013.01); *B62D 15/025* (2013.01); *G01C 21/20* (2013.01); *G01C 21/3484* (2013.01); *G05D 1/00* (2013.01); *G05D 1/0088* (2013.01); *G05D 1/0221* (2013.01); *G05D 1/0242* (2013.01); *G06N 3/0454* (2013.01); *G06N 3/0472* (2013.01); *B60W 2420/42* (2013.01); *G08G 1/165* (2013.01); *G08G 1/166* (2013.01)

(58) Field of Classification Search
CPC ............... G06N 3/0472; G06N 3/0454; B60K 31/0008; G05D 1/0242; G05D 1/0027; G05D 1/0221; G05D 1/0088; G05D 1/00; G08G 1/165; G08G 1/166; B60W 2420/42; B60W 60/0011; B60W 60/001; B60W 2556/45; B60W 2556/65; B69W 50/082
See application file for complete search history.

(56) References Cited

U.S. PATENT DOCUMENTS

| | | | |
|---|---|---|---|
| 7,487,017 | B1 | 2/2009 | Bell |
| 7,657,466 | B2 | 2/2010 | Klingenberg et al. |
| 8,743,244 | B2 | 6/2014 | Vartanian et al. |
| 8,949,016 | B1 | 2/2015 | Ferguson et al. |
| 9,096,354 | B2 | 8/2015 | Baudson et al. |
| 9,150,224 | B2 | 10/2015 | Yopp |
| 9,177,481 | B2 | 11/2015 | Wang et al. |
| 9,336,506 | B2 | 5/2016 | Shucker et al. |
| 9,359,074 | B2 | 6/2016 | Ganesh et al. |
| 9,459,620 | B1 | 10/2016 | Schaffalitzky |
| 9,672,734 | B1 * | 6/2017 | Ratnasingam ....... G08G 1/0968 |
| 10,002,658 | B1 * | 6/2018 | Hokenmaier ........ G11C 7/1006 |
| 2002/0120396 | A1 | 8/2002 | Boies et al. |
| 2005/0084975 | A1 | 4/2005 | Armentrout |
| 2005/0228553 | A1 | 10/2005 | Tryon |
| 2005/0251324 | A1 | 11/2005 | Wiener et al. |
| 2007/0198159 | A1 | 8/2007 | Durkos et al. |
| 2008/0161987 | A1 | 7/2008 | Breed |
| 2011/0238289 | A1 | 9/2011 | Lehmann et al. |
| 2012/0028680 | A1 | 2/2012 | Breed |
| 2012/0030133 | A1 | 2/2012 | Rademaker |
| 2012/0083982 | A1 | 4/2012 | Bonefas |
| 2012/0136895 | A1 | 5/2012 | Johnson |
| 2012/0022639 | A1 | 9/2012 | Fryer et al. |
| 2012/0226391 | A1 | 9/2012 | Fryer et al. |
| 2012/0314032 | A1 | 12/2012 | Muensterer et al. |
| 2013/0023182 | A1 | 9/2013 | Wilson et al. |
| 2013/0231824 | A1 | 9/2013 | Wilson et al. |
| 2013/0282208 | A1 | 10/2013 | Mendez-Rodriguez et al. |
| 2014/0032034 | A1 | 1/2014 | Raptopoulos et al. |
| 2014/0088865 | A1 | 3/2014 | Thies et al. |
| 2014/0180914 | A1 | 6/2014 | Abhyanker |
| 2014/0180959 | A1 | 6/2014 | Gillen et al. |
| 2014/0330456 | A1 | 11/2014 | Morales et al. |
| 2015/0120094 | A1 | 4/2015 | Kimchi et al. |
| 2015/0149017 | A1 | 5/2015 | Attard et al. |
| 2015/0017899 | A1 | 6/2015 | Attard et al. |
| 2015/0154559 | A1 | 6/2015 | Barbush et al. |
| 2015/0158599 | A1 | 6/2015 | Sisko |
| 2015/0178998 | A1 | 6/2015 | Attard et al. |
| 2015/0253775 | A1 | 9/2015 | Jacobus |
| 2015/0370251 | A1 | 12/2015 | Siegel et al. |
| 2016/0033966 | A1 | 2/2016 | Farris et al. |
| 2016/0011793 | A1 | 4/2016 | Park et al. |
| 2016/0107750 | A1 | 4/2016 | Yates |
| 2016/0117932 | A1 | 4/2016 | Park et al. |
| 2016/0129787 | A1 | 5/2016 | Netzer |
| 2016/0161275 | A1 | 6/2016 | Waltermann et al. |
| 2016/0179096 | A1 | 6/2016 | Bradlow et al. |
| 2016/0325753 | A1 | 11/2016 | Stein et al. |
| 2016/0334229 | A1 | 11/2016 | Ross et al. |
| 2017/0008521 | A1 | 1/2017 | Braunstein et al. |
| 2017/0193338 | A1 | 7/2017 | Huberman et al. |
| 2018/0107215 | A1 | 4/2018 | Djuric et al. |
| 2018/0209801 | A1 | 7/2018 | Stentz et al. |
| 2018/0341836 | A1 | 11/2018 | Lim et al. |
| 2018/0364725 | A1 | 12/2018 | Lonari |
| 2019/0011934 | A1 | 1/2019 | DeBitetto et al. |
| 2019/0017839 | A1 | 1/2019 | Eyler et al. |

OTHER PUBLICATIONS

Office Action dated Oct. 1, 2020, in corresponding Singapore application No. 11201913991U, filed Jul. 24, 2018, 7 pages.
Jing Huang et al., Point Cloud Matching based on 3D Self-Similarity, 2012 IEEE Computer Society Conference on computerVision and Pattern Recognition Workshops, Jun. 16-21, 2012, IEEE.
Radu Bogdan Rusu et al., Aligning Point Cloud Views using Persistent Feature Histograms, 2008 IEEE/RSJ International Conference on Intelligent Robots and Systems, Sep. 22-26, 2008, IEEE.
Vit Goncharuk, Markerless Drone Delivery Is Indeed Possible, http://augmentedpixels.com/markerless-drone-delivery/, Dec. 2, 2015.
Indoor Navigation Platform, Augmented Pixels, http://www.slideshare.net/augmentedpixels/indoor-navigation-platform, Sep. 8, 2015.
Andrea Cesetii et al., A Vision-Based Guidance System for UAV Navigation and Safe Landing Using Natural Landmarks, Journal of Intelligent and Robotic Systems, Jan. 2010, pp. 233-257, 57(1).
Ayanna Howard et al., Multi-Sensor Terrain Classification for Safe Spacecraft Landing, IEEE Transaction on Aerospace and Electronic Systems, Oct. 2004, vol. 40, Issue 4, pp. 1112-1131.
Navid Serrano et al., Landing Site Selection using Fuzzy Rule-Based Reasoning, Proceedings 2007 IEEE International Conference on Robotics and Automation, Apr. 10-14, 2007, IEEE.
Colin Theodore et al., Flight Trials of a Rotorcraft Unmanned Aerial Vehicle Landing Autonomously at Unprepared Sites, American Helicopter Society 62nd Annual Forum, Phoenix, AZ, May 9-11, 2006.
Connor A Theilmann, Integrating Autonomous Drones into the National Aerospace System, Senior Capstone Thesis, University of Pennsylvania School of Engineering and Applied Science, Department of Computer and nformation Science, Apr. 29, 2015.
Sven Lange et al., Autonomous Landing for a Multirotor UAV Using Vision, Workshop Proceedings of SI MPAR J008 International Conference of Simulation, Modeling, and Programming for Autonomous Robots, Nov. 2008, pp. 482-491.
Stephen M. Chaves et al., NEEC Research: Toward GPS-denied Landing of Unmanned Aerial Vehicles on Ships at Sea, Naval Engineers Journal, 2015, vol. 127, Issue 1, pp. 23-35.
Weiwei Kong et al., Autonomous Landing of an UAV with a Ground-Based Actuated Infrared Stereo Vision 12 System, 2013 IEEE/RSJ International Conference on Intelligent Robots and Systems, Nov. 3-7, 2013.
Pal Moen Most, Visual Navigation of an autonomous drone, Master of Science in Informatics thesis at Norwegian University of Science and Technology Department of Computer and Information Science, Feb. 1, 2014.

(56) References Cited

OTHER PUBLICATIONS

Fabrizio Lamberti et al., Mixed Marker-Based/Marker-Less Visual Odometry System for Mobile Robots, International Journal of Advanced Robotic Systems, vol. 10, 2013.

Miguel A Olivares-Mendez et al., Fuzzy Controller for UAV-landing task using 3D-position Visual Estimation, J01Q IEEE International Conference on Fuzzy Systems (FUZZ), Jul. 18-23, 2010.

Abder Larranaga-Cepeda et al., On-line dense point cloud generation from monocular images with scale estimation, 13th Mexican International Conference on Artificial Intelligence, MICAI 2014, Tuxtla Gutierrez, Mexico, Nov. 16-22, 2014. Proceedings, Part I.

Eddie Krassenstein, Drone Package Delivery is Here! 1st FAA Approved Delivery by 3D Printed Flirtey Drone Takes Place Next Month, 3D Printing.com, https://3dprinl.com/75895/llirtey-drone-delivery/.

Laura Wenus, Self Propelling Delivery Robots Testing In the Mission, Mission Local, Feb. 21, 2017.

PCT International Search Report and Written Opinion issued in International Application No. PCT/US2018/043458, dated Nov. 9, 2018, 12 pages.

Extended European Search Report dated May 5, 2021, issued in corresponding European Application No. EP 18842338.8, filed Jul. 24, 2018, 8 pages.

\* cited by examiner

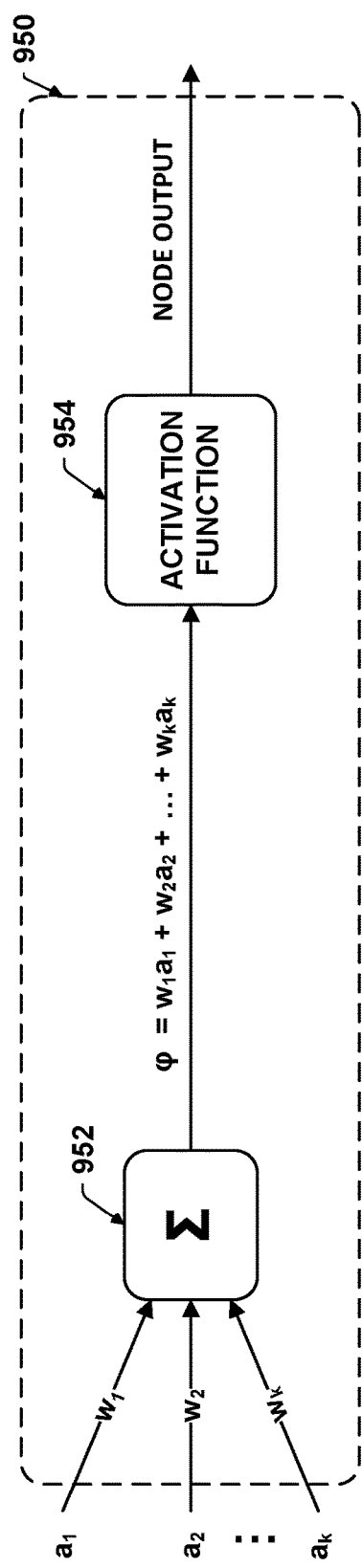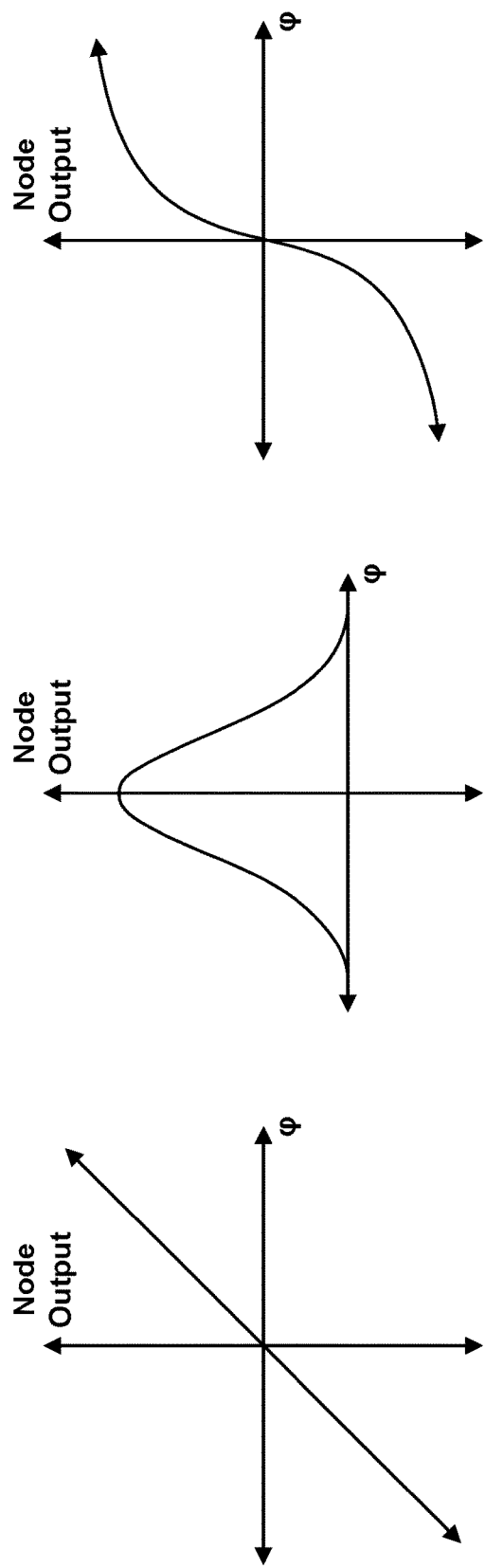
FIG. 9A
FIG. 9B
FIG. 9C
FIG. 9D

SYSTEMS AND METHODS FOR DETERMINING PATH CONFIDENCE FOR UNMANNED VEHICLES

BACKGROUND

Autonomous vehicles, also referred to as unmanned vehicles, are capable of travel without a physically-present human operator. Some autonomous vehicles may have the capability to operate in different modes, such as a remote-control mode, a partially autonomous mode, and an autonomous mode. During the remote-control mode, the vehicle may operate according to controls provided by a remotely positioned operator. A control system may control navigation of the vehicle during the autonomous mode. The operator and control system may share controls of the vehicle during the partially autonomous mode. For instance, the operator may choose to let the control system handle navigation while providing non-navigation controls to complete a task, such as operating a mechanical system to physically deliver an object.

SUMMARY

Example implementations for determining path confidence for a vehicle are described herein. Advancements in sensors, computing capabilities, and other technologies have enabled vehicles capable of autonomous operation to be used to complete tasks, such as package transportation and delivery, among other useful operations. However, a vehicle's control system may need to learn how to navigate at a target location and traverse obstacles at the location prior to being able to complete a task safely and efficiently without human assistance. Example implementations disclosed herein aim to help a vehicle's control system learn how to navigate through different environment layouts to complete requested tasks at target locations. In particular, some examples may involve a remote human operator providing assistance until a vehicle's control system acquires enough information to confidently navigate without remote assistance. With this arrangement, the control system may rely less upon remote assistance over time to perform deliveries or other potential tasks.

In one aspect, an example method is provided. The method includes receiving a request for a vehicle to navigate a target location. The method further includes determining a navigation path for the vehicle to traverse a first segment of the target location based on a plurality of prior navigation paths previously determined for traversal of segments similar to the first segment of the target location. The method also includes determining a confidence level associated with the navigation path. Based on the determined confidence level, the method additionally includes selecting a navigation mode for the vehicle from a plurality of navigation modes corresponding to a plurality of levels of remote assistance. The method further includes causing the vehicle to traverse the first segment of the target location using a level of remote assistance corresponding to the selected navigation mode for the vehicle.

In another aspect, an example system is provided. The system includes a vehicle and a control system. The control system may be configured to receive a request for the vehicle to navigate a target location. The control system may be further configured to determine a navigation path for the vehicle to traverse a first segment of the target location based on a plurality of prior navigation paths previously determined for traversal of segments similar to the first segment of the target location. The control system may also be configured to determine a confidence level associated with the navigation path. Based on the determined confidence level, the control system may additionally be configured to select a navigation mode for the vehicle from a plurality of navigation modes corresponding to a plurality of levels of remote assistance. The control system may also be configured to cause the vehicle to traverse the first segment of the target location using a level of remote assistance corresponding to the selected navigation mode for the vehicle.

In a further aspect, a non-transitory computer readable medium is provided. The non-transitory computer readable medium has stored therein instructions executable by one or more processors to cause a computing system to perform functions. The functions include receiving a request for a vehicle to navigate a target location. The functions further include determining a navigation path for the vehicle to traverse a first segment of the target location based on a plurality of prior navigation paths previously determined for traversal of segments similar to the first segment of the target location. The functions also include determining a confidence level associated with the navigation path. Based on the determined confidence level, the functions additionally include selecting a navigation mode for the vehicle from a plurality of navigation modes corresponding to a plurality of levels of remote assistance. The functions further include causing the vehicle to traverse the first segment of the target location using a level of remote assistance corresponding to the selected navigation mode for the vehicle.

In a further example, a system is provided that includes means for receiving a request for a vehicle to navigate a target location. The system further includes means for determining a navigation path for the vehicle to traverse a first segment of the target location based on prior navigation paths determined to traverse segments similar to the first segment of the target location. The system also includes means for determining a confidence level associated with the navigation path. Based on the determined confidence level, the system additionally includes means for selecting a navigation mode for the vehicle from a plurality of navigation modes corresponding to a plurality of levels of remote assistance. The system further includes means for causing the vehicle to traverse the first segment of the target location using a level of remote assistance corresponding to the selected navigation mode for the vehicle.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 9A illustrates a structure of an example node of an artificial neural network.

FIGS. 9B, 9C, and 9D illustrate example activation functions.

DETAILED DESCRIPTION

Figure 1:
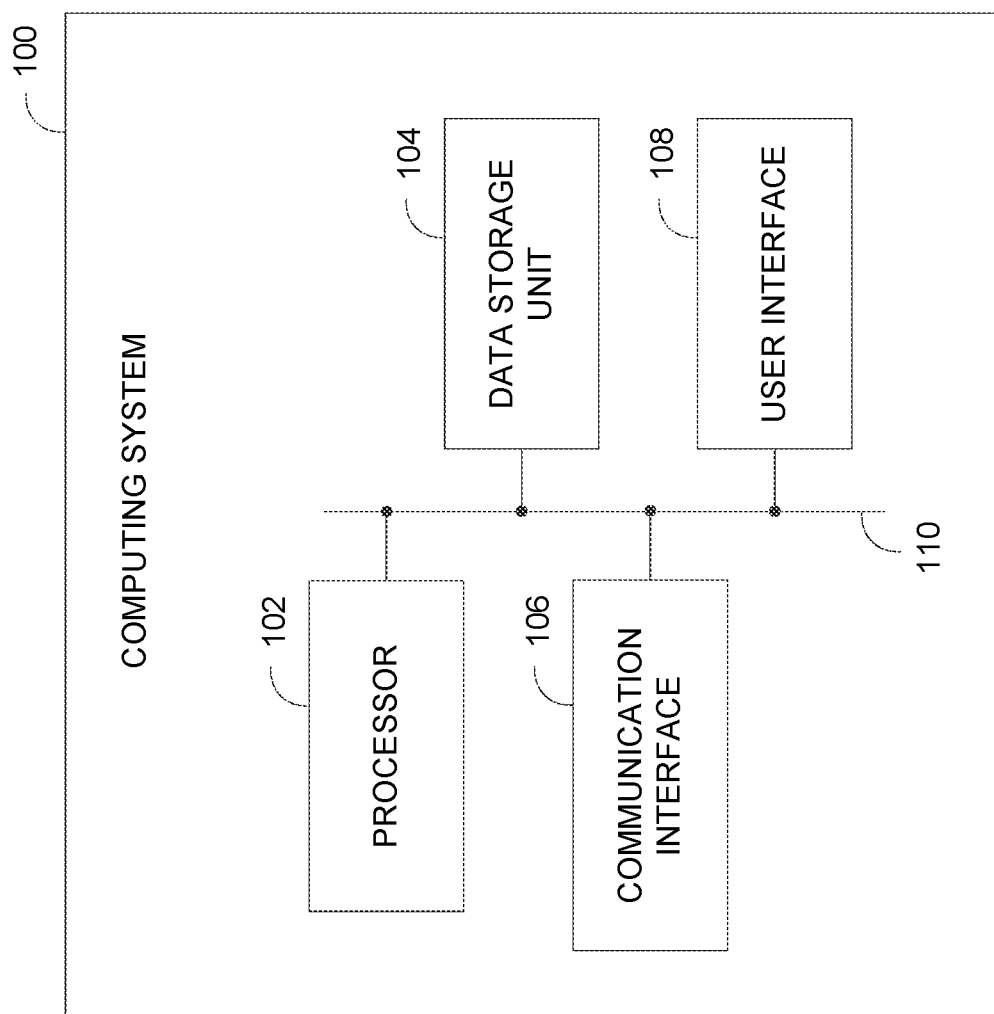
FIG. 1 is a simplified block-diagram of an example computing system.

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

Improvements in technology have helped promote the package and materials transportation industry. With rising demand for shipping and delivery services, vehicles capable of remote control and autonomous operation are starting to be tested and used at different stages of the shipping process, such as the package pickup, transportation, and delivery stages. Although semi-autonomous and autonomous vehicles may offer some advantages over current techniques, a vehicle's autonomous control system may sometimes lack the ability to safely navigate and complete tasks without human assistance, especially in unfamiliar locations.

In some instances, an autonomous vehicle may encounter an environment layout including physical obstacles or surfaces that the vehicle is unable to confidently navigate. In such situations, the vehicle's control system may cause the vehicle to perform operations that a human would typically avoid. For example, the control system may navigate the vehicle through areas that a package recipient may view as off-limits, such as gardens, private walkways, or lawns. In some cases, the control system may not be able to confidently identify a viable navigation path for the vehicle at all. Thus, although autonomous and semi-autonomous vehicles can present some potential benefits that may improve elements of the shipping process, other aspects of their use may also cause problems that can negate some or all of the potential benefits.

Example systems and methods presented herein may help reduce potential drawbacks associated with using autonomous and semi-autonomous vehicles to perform tasks at a target location, such as package delivery. In particular, a machine learning model for controlling a vehicle may be trained in stages. A remotely positioned human operator may initially remotely control the vehicle to perform tasks. This human operation may be used to train the model for specific tasks until the model gains sufficient confidence to run independently on the tasks. The model may then fall back to human assistance if the model has low confidence for a task. If either the remote human operator or the model is successful in performing a task, this information may be kept as additional training data for the model.

More specifically, the model may be an artificial neural network (ANN) that generates a navigation path for a vehicle to navigate a segment of a target location. In some examples, the model may be a probabilistic path-finding model that generates a distribution of navigation paths and associated probabilities. The model may be trained based on navigation paths chosen by remote operators to navigate similar locations or the same location at an earlier point in time. After the model has been trained with enough information to confidently determine a path to navigate through a location, the control system may autonomously control the vehicle to navigate through similar locations without reliance upon remote assistance. In some examples, the model may be split between a shared part for all types of vehicles, and a vehicle-specific part that takes into account the locomotive capabilities of any given vehicle.

In some implementations, a vehicle's control system may divide a task, such as the delivery of an object to a location, into multiple subtasks. Each subtask may correspond to a separate segment of a target location. For instance, the control system may divide the delivery into a first subtask involving reaching a position relative to the target drop off location and a second subtask involving physically delivering the object at the target drop off location. The model may be run separately to determine a separate navigation path for each separate segment or subtask.

In some implementations, the control system may identify prior navigation paths determined for locations similar to a segment of the target location. A similar location may share various features with the segment of the target location, such as having a similar topology or a similar surface material type, among other similarities. Some or all of the prior navigation paths may have been provided by a remote operator and previously followed at a similar location by the vehicle or another vehicle. Some or all of the prior navigation paths may have also been provided by operators in simulation and never actually followed by vehicles. Some or all of the prior navigation paths may have been autonomously determined by control systems of vehicles as well or instead.

As noted above, in order to determine a navigation path for a segment of a target location, a machine learning model may be used. The model may have been trained based on previously determined navigation paths for similar locations. When data representing a segment of a target location is input, the model may output a distribution of possible navigation paths for the vehicle to follow. In some examples, the input data may be sensor data from one or more sensors on the vehicle. In additional examples, the input data may come from other data sources, such as saved map data or sensor data from other examples. In some examples, each possible navigation path may be given a corresponding probability indicating a likelihood that the path is an optimal path. In further examples, the distribution of possible navigation paths may be represented as a grid representing a portion of the target location where each cell of the grid on a possible navigation path is highlighted. As the control system becomes more confident in a navigation path, the distribution of possible paths will narrow (e.g., fewer cells in the grid will be highlighted).

Other factors may also be input into the machine learning model. In some examples, a navigation path or distribution of navigation paths may be determined based on a vehicle's locomotive capabilities. For instance, the vehicle could be wheeled, legged, or aerial. In further examples, the distribution of navigation paths may be determined based on properties of a package to be delivered by the vehicle, such as size, weight, etc. In additional examples, weather conditions and/or other environmental conditions may also be input into the machine learning model. In some examples, the control system may associate goals with various subtasks that influence navigation paths, such as a goal to not destroy or harm the environment during navigation (e.g., obstacle avoidance) and a goal directed towards completing the overall task in a minimum amount of time.

The control system may determine a confidence level associated with a navigation path. A control system may have less confidence in a navigation path when the terrain is unfamiliar and/or particularly challenging (e.g., lots of slopes, stairs). In situations where a large number of prior navigation paths for highly similar situations are available, the control system may determine that its confidence level in a navigation path is high. A high confidence level may indicate that the control system can likely cause the vehicle to complete the task without much or any remote assistance. On the other hand, in situations where the control system lacks sufficient prior navigation paths and/or the terrain is inherently challenging, the control system may determine that it has a low confidence level associated with autonomously navigating the location. The low confidence level may signal that the control system should request some amount of remote assistance from a remote operator.

In some examples, the evaluation of model confidence can be done using statistical analysis of the output classification from the model. For instance, the model may be a probabilistic path-finding model that generates a distribution of possible navigation paths and associated probabilities. A confidence level may then be determined based on the probability associated with the navigation path having the highest probability within the distribution. The variance of the distribution of possible navigation paths may also be considered; a narrower distribution may indicate a greater confidence level.

In further examples, navigation paths may be generated using a generative adversarial network (GAN). A GAN may involve a system of two models (e.g., two neural networks) competing against each other. In particular, the output of a path-planning model may be fed into a discriminator model. The discriminator model may be trained to differentiate between paths from the path-planning model and paths provided by a human operator. In particular, the discriminator model is trained to distinguish paths that an operator provided while the path-planning model is trained to generate navigation paths that trick the discriminator model. Over time, the path-planning model will get good enough to consistently trick the discriminator model, at which point the system may be confident that paths generated by the path-planning model are viable paths.

In some examples, a control system of a vehicle may initially receive instructions to perform a delivery or another task at a target location. For instance, the control system may receive the instructions from a network of systems arranged to organize and dispatch a group of vehicles to complete tasks, such as package deliveries, according to the types of requests, the target locations, and locations and capabilities of the vehicles, among other possible factors. After analyzing the instructions and information associated with navigating the target location and performing the task (e.g., delivering the package), the control system may determine that it lacks enough confidence to perform the delivery without remote assistance. For instance, the control system may determine that the system lacks familiarity with navigating the target location and does not have a sufficient number of prior navigation paths used at similar locations to confidently determine a navigation path to use at the target location. In other situations, the control system may have sufficient information about the target location and prior navigation paths to use to autonomously determine a navigation path for completing the task.

After determining a confidence level associated with completing a requested task (or one or more subtasks of the overall task), the control system may proceed with causing the vehicle to complete the task (e.g., the delivery request) at the target location. In some examples, the control system may request a level of remote assistance that depends on the determined confidence level and proceed to cause the vehicle to complete the task using that level of remote assistance. For example, the control system may determine that it can complete a desired task without remote assistance based on its confidence in the output of a path-planning model. If this is the case, the control system may provide instructions to systems of the vehicle to complete the task without requesting help from an operator. In such a situation, the control system may refrain from requesting remote assistance unless the vehicle encounters a situation that the control system is unable to overcome, such as an unexpected obstacle.

In other examples, the control system may determine that remote assistance is required to perform a task or subtask. As a result, the control system may cause the vehicle to complete the delivery request using assistance provided by a remotely positioned operator. For example, the control system may send a request for assistance after determining that its confidence level for completing a subtask is below a predetermined threshold level. After receiving a signal back from the operator, the vehicle may complete the task using some amount of input from the operator.

In some examples, the transition of control of an autonomously-capable vehicle may occur over time. In other words, a vehicle's control system may assume more control of the vehicle as the control system experiences increasing numbers of iterations of deliveries. For example, initial deliveries at a new location may cause a vehicle's control system to rely completely upon the navigation controls provided by an operator. Here, the operator may use sensor data, such as video and audio from a vehicle's sensor system to safely navigate the vehicle to complete the delivery (or other task). In a further example, the operator may also be present at the target location along with the vehicle (e.g., inside the vehicle or next to the vehicle) while providing instructions.

In further examples, additional levels of granularity may be used to determine the amount of remote assistance to request. To illustrate, the control system may request a moderate amount of assistance in situations where the control system determines a medium level of confidence associated with completing a task. This may involve the control system requesting the operator to set or refine waypoints that the system may follow to navigate the target location and complete the delivery. In another example, the control system may request the operator to control navigation while the system controls other aspects of completing the delivery (e.g., operating a manipulator to place the object at the location). In additional examples, the control system may submit a request for an operator to monitor the vehicle as the control system controls the vehicle. With this arrangement, the control system may present an operator with the control system's best guess for a navigation path to follow, which the operator may confirm or override.

Furthermore, in some examples, a vehicle's control system may adjust its confidence level throughout the performance of a task. For instance, the control system may initially start performing a task in an autonomous mode while navigating through a first segment of a target location. However, upon running the path-planning model on a second segment of the target location, the control system may determine that it has a lower confidence in the second segment than the first segment. The control system may then request some level of remote assistance to navigate the second segment of the target location.

In another example, the control system may determine that a target location is new and request that the operator assumes complete control of the vehicle from the operator's remote position. As a result, the operator may be provided with a display that includes sensor data (e.g., video, audio) from the vehicle's sensors to control the vehicle to complete the delivery. The control system may measure and store the controls provided by the operator for future use during subsequent deliveries at that target location or similar locations (e.g., that house or other houses in the neighborhood). In some examples, the control system may store sensor data and the operator's control instructions in distributed storage memory that enables the control systems of other vehicles to access and use that information to help determine strategies for completing other related tasks.

Within examples, vehicles used to complete requested tasks may correspond to various types of vehicles, including traditional (e.g., trucks, forklifts, cars, tractors), and non-traditional vehicles (e.g., robots, unmanned aerial vehicles). For instance, a vehicle that may be used to perform deliveries may resemble a four-wheeled vehicle, but can also be a robotic device (e.g., biped, quadruped) or an aerial vehicle (e.g., biplane, multicopter). Additionally, the vehicles may be part of a group of vehicles organized and dispatched by a system that receives requests and assigns the tasks to the vehicles accordingly. In particular, the system may include one or more computing systems that communicate to organize vehicles according to capabilities and/or location to complete requested tasks. For example, the system may receive delivery requests and select vehicles to complete the delivery requests based on the target locations, the locations of the packages to be shipped, specifics associated with the packages (e.g., size, materials), and/or the current or future locations of the vehicles.

Referring now to the figures, FIG. 1 is a simplified block-diagram of an example computing system 100 that can perform various acts and/or functions, such as those described in this disclosure. Computing system 100 can serve as a control system for an autonomous or partially-autonomous vehicle, such as a ground-vehicle, aerial vehicle, robotic device, etc., and can include various components, such as processor 102, data storage unit 104, communication interface 106, and/or user interface 108. The components as well as other possible components may connect to each other (or to another device, system, or other entity) via connection mechanism 110, which represents a mechanism that facilitates communication between two or more devices, systems, or other entities. As such, connection mechanism 110 can be a simple mechanism, such as a cable or system bus, or a relatively complex mechanism, such as a packet-based communication network (e.g., the Internet). In some instances, a connection mechanism can include a non-tangible medium (e.g., where the connection is wireless). In a further implementation, computing system 100 can include more or fewer components, including components not shown in FIG. 1.

Processor 102 may correspond to a general-purpose processor (e.g., a microprocessor) and/or a special-purpose processor (e.g., a digital signal processor (DSP)). In some instances, computing system 100 may include a combination of processors.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. For instance, communication interface 106 may enable computing system 100 to receive requests and communicate with other devices. The requests and communication may correspond to requests to perform tasks at target location, such as object pickups and/or deliveries. In an example, communication interface 106 can be a wired interface, such as an Ethernet interface or a high-definition serial-digital-interface (HD-SDI). In another example, communication interface 106 can be a wireless interface, such as a cellular or WI FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 108 can facilitate interaction between computing system 100 and a user of computing system 100, if applicable. As such, user interface 208 can include input components such as a keyboard, a keypad, a mouse, a touch sensitive panel, a microphone, and/or a camera, and/or output components such as a display device (which, for example, can be combined with a touch sensitive panel), a sound speaker, and/or a haptic feedback system. More generally, user interface 108 can include hardware and/or software components that facilitate interaction between computing system 100 and the user of the computing device system.

In some implementations, communication interface 106 and user interface 108 may enable a human-operator positioned remotely to communicate with computing system 100. For instance, computing system 100 may enable the operator to provide controls to navigate or control other operations of vehicle controlled by computing system 100.

Figure 2:
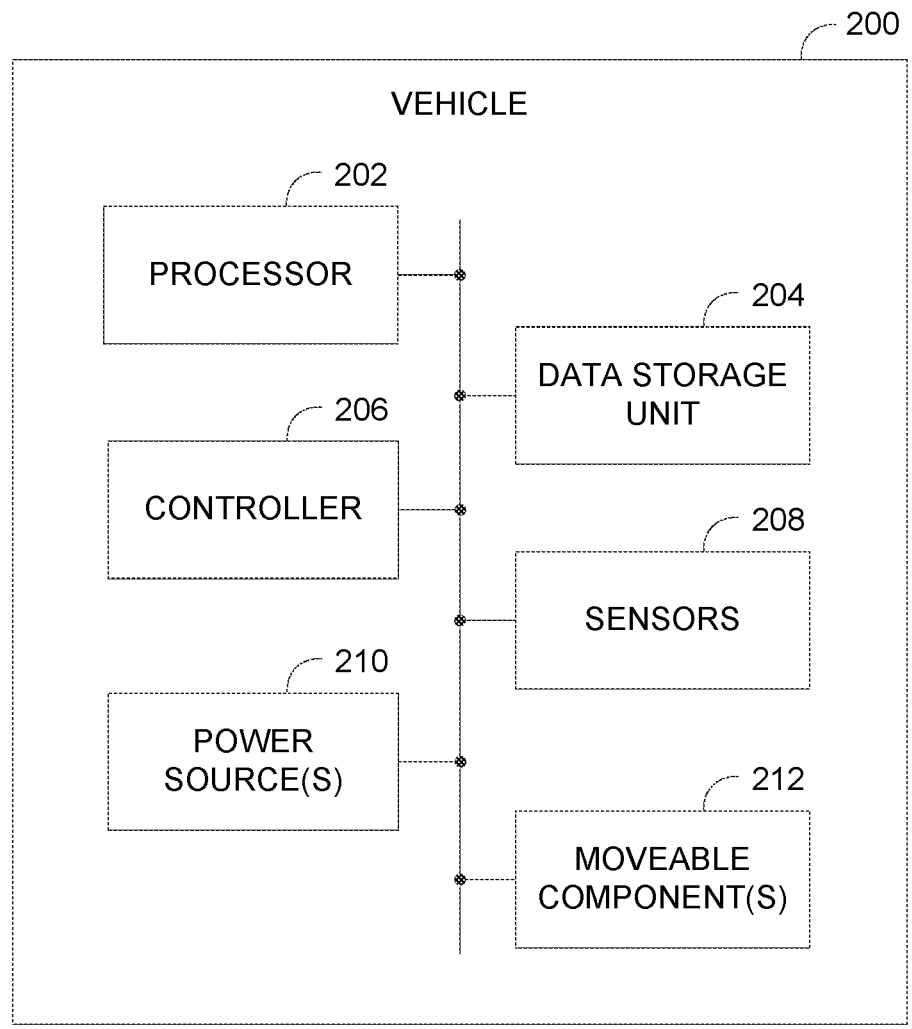
FIG. 2 is a simplified block-diagram of an example vehicle

FIG. 2 is a simplified block-diagram of an example autonomous vehicle system 200, which represents one possible configuration of an autonomous or partially-autonomous vehicle capable of performing processes and operations described herein. Vehicle system 200 may represent the components of various types of vehicles, such as a ground-oriented vehicles, robots, or aerial vehicles, among other possibilities. As shown in FIG. 2, vehicle system 200 includes processor 202, data storage unit 204, controller 206, sensors 208, power source(s) 210, and movable component(s) 212, but may include more or fewer components arranged and connected in any manner without departing from the scope of the disclosure. For instance, components included within system 200 may form a control system (e.g., computing system 100) capable of controlling one or more operations of vehicle.

Similar to processor 102 shown in FIG. 1, processor 202 may be a general-purpose processor or a special purpose processor (e.g., digital signal processors, application specific integrated circuits, etc.), and may be configured to execute computer-readable program instructions stored in data storage unit 204 that are executable to provide the functionality of system 200. The program instructions may be executable to provide functionality of controller 206, which may be configured to instruct an actuator or other component of system 200 to cause movement of one or more movable component(s) 212, among other operations. Data storage unit 204 may include or take the form of one or more computer-readable storage media that can be read or accessed by processor 202. The computer-readable storage media can include volatile and/or non-volatile storage components, such as optical, magnetic, organic or other memory or disc storage, which can be integrated in whole or in part with processor 202. In some implementations, data storage 204 can be implemented using a single physical device (e.g., one optical, magnetic, organic or other memory or disc storage unit), while in other implementations, data storage 204 can be implemented using two or more physical devices. Further, data storage 204 may also include additional data such as diagnostic data, among other possibilities. In some implementations of system 200, processor 202, data storage 204, and/or controller 206 may operate as part of a control system configured to control one or more operations of system 200.

Vehicle system 200 may include one or more sensors 208, such as force sensors, proximity sensors, load sensors, position sensors, capacitive sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others.

The amount and type of sensors 208 may vary depending on the configuration and uses of system 200. For example, sensors 208 may provide sensor data to processor 202 to enable vehicle system 200 to operate within an environment. Sensors 208 may also measure aspects of system 200, including monitoring functionality and detecting potential component errors. In some examples, sensors 208 may enable a control system (e.g., computing system 100) of vehicle system 200 to measure aspects of a target location in order to perform one or more tasks at the location. For example, the control system may use sensor data to navigate the target location, avoid obstacles, and to perform other operations, such as handling objects. In a further example, vehicle system 200 may include one or more sensors 208 configured to measure the weather to assist in determining strategies for completing tasks. In addition, sensors 208 may also capture and provide audio and/or video (and possibly other types of information) to a remotely positioned operator that can use the information to control vehicle system 200.

Vehicle system 200 may also include one or more power source(s) 210 configured to supply power to various components of vehicle system 200. Any type of power source may be used such as, for example, a gasoline engine or a battery. Vehicle system 200 may also include a transmission system that may be coupled to portions of the hardware of vehicle system 200. In some examples, the transmission system may include components, such as clutches, differentials, pulleys, cables, belts, drive shafts, and/or other possible elements. As such, the transmission system may change speed, torque, and direction of rotation of hardware components of vehicle system 200.

Vehicle system 200 may further include one or more actuators, which can produce mechanical motion. In particular, an actuator may be configured to convert stored energy into movement of one or more components. For instance, actuators may be powered by chemicals, compressed air, hydraulics, or electricity, among other possibilities. With this arrangement, actuators and/or the transmission system may cause movement of various movable component(s) 212, which may include appendages, such as robotic arms or other mechanical structures. For instance, actuators may enable an actuator to lift and move an object (e.g., pick up and drop off a package). Further, moveable component(s) 212 may also include a movable base, wheels, grippers, tools and/or end effectors, among others. Moveable component(s) 212 may enable vehicle system 200 to complete a variety of tasks.

It is important to note that the configuration and components of vehicle system 200 may vary within examples, which can depend on the type and abilities of vehicle system 200. For instance, an aerial vehicle system may include other components that enable aerial navigation and particular sensors that assist the aerial vehicle complete particular tasks suitable for aerial vehicles.

Figure 3:
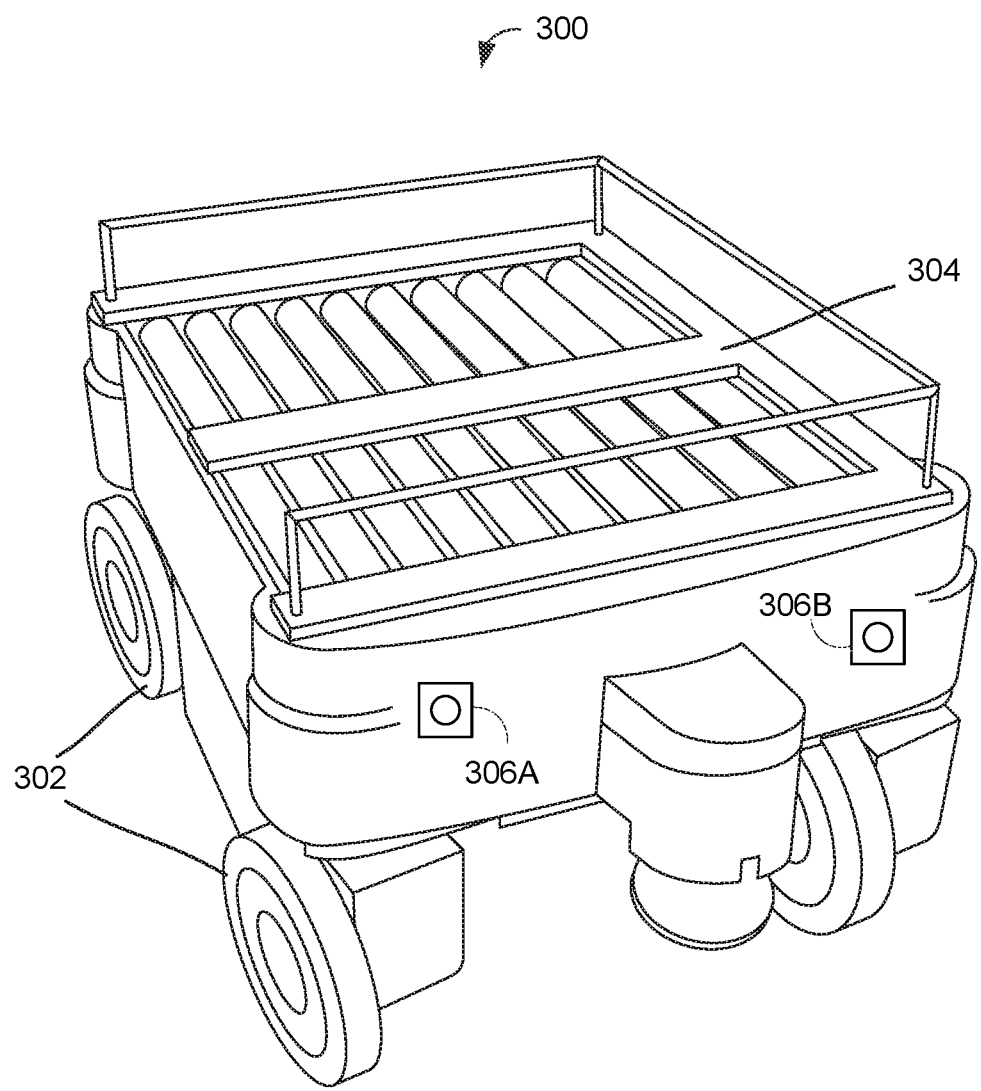
FIG. 3 illustrates an example vehicle.

FIG. 3 illustrates example autonomous vehicle 300, which represents one type of ground vehicle that may perform operations discussed herein. Vehicle 300 may be a physical representation of vehicle system 200 shown in FIG. 2 and includes wheels 302, cargo bed 304, and sensors (sensor 306A, sensor 306B). In other examples, vehicle 300 may have more or fewer components, including one or more components not shown in FIG. 3, such as a control system and/or one or more manipulators configured to handle objects.

As indicated above, vehicle 300 may include a computing system and sensors (sensor 306A, 306B) that enable vehicle 300 to operate in multiple modes, such as an autonomous, partially autonomous, and remote-control mode. When operating in an autonomous or partially autonomous mode, the control system (e.g., computing system 100) may control one or more operations of vehicle 300, such as navigation strategy (e.g., route planning), obstacle avoidance, and object manipulation. The control system may use information from various sources to determine control strategies, including information obtained from memory (e.g., storage physically on vehicle 300 and/or cloud storage memory), from other devices (e.g., map from a server system), and from sensors (e.g., sensors 306A, 306B). The control system may also operate according to instructions provided by a device associated with a remote operator.

When operating in a remote-control mode, an operator may assume direct control of one or more operations of vehicle 300. For example, the operator may provide control instructions based on sensor data (e.g., images, video, GPS coordinates) from sensors (e.g., sensors 306A-306B) positioned on vehicle 300. In some instances, the operator and control system may share partial control of vehicle 300. For instance, the operator may control navigation of vehicle 300 while the control system controls manipulators positioned on vehicle 300.

During operation, vehicle 300 may navigate using wheels 302. Example wheels may exist in various materials and may include a single wheel, double wheel, compound wheel, castor wheel, or any other wheel configured to rotate to move vehicle 300. Additionally, in some examples, wheels 302 may include an energy-absorbing material (e.g., rubber, etc.) to facilitate operation and/or maintenance of wheels 302. For examples, wheels 302 may include a tire coupled to a rim of each wheel. In other examples, vehicle 300 may include other mechanics that enable locomotion, such as caterpillar tracks.

Cargo bed 304 is a mechanical component of vehicle 300 that may carry packages and other objects. As such, cargo bed 304 may include mechanics can assist moving an object, such as rollers that may push objects off vehicle 300 or a mechanical actuator that may lift and position objects (not shown). Although vehicle 300 includes cargo bed 304, other types of ground vehicles may have other physical configurations and attributes that differ from vehicle 300. In particular, other types of vehicles may have configurations that depend on the tasks that the vehicles are used to perform. For example, another example ground vehicle may include seating that permits the vehicle to transport passengers.

Vehicle 300 further includes sensors 306A, 306B to capture information of the vehicle's surrounding environment and/or operations of components of vehicle 300. Sensors 306A, 306B may correspond to various types of sensors and may assist a control system and/or human operator performs operations using vehicle 300. Vehicle 300 may also include other types of sensors not shown in FIG. 3.

Figure 4:
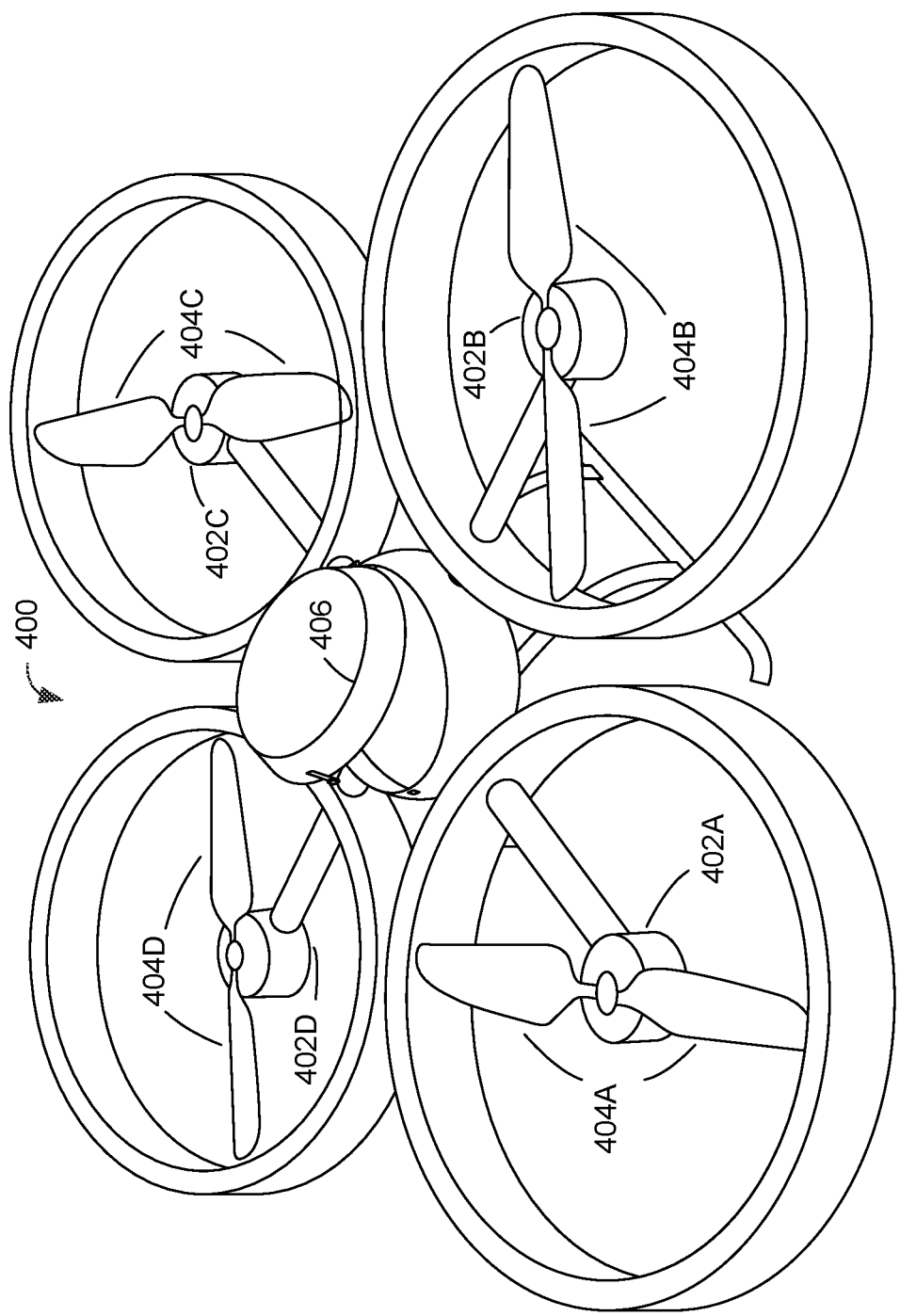
FIG. 4 illustrates another example vehicle.

FIG. 4 illustrates another example autonomous vehicle 400, which represents another type of vehicle capable of performing operations discussed herein. Unlike vehicle 300, vehicle 400 represents an example aerial vehicle that may navigate between locations by traveling in the air. Although vehicle 400 is shown as a type of multicopter, other types of aerial vehicles may also perform operations described herein.

As shown in FIG. 4, vehicle 400 includes four rotors 402A, 402B, 402C, 402D configured to provide propulsion and maneuverability to vehicle 400 using power from motor 406. More specifically, rotor 402A includes blades 404A, rotor 402B includes blades 404B, rotor 402C includes blades 404C, and rotor 402D includes blades 404D. With this configuration, rotors 402A-402D may enable vehicle 400 to take off and land vertically, maneuver in all directions, and hover, among other possible operations. For instance, vehicle 400 may adjust the pitch of the blades to control its pitch, roll, yaw, and altitude. In another example, vehicle 400 may a different configuration, such as multiple motors.

Vehicle 400 may further include mechanical components configured to manipulate and hold objects. For example, vehicle 400 may include a mechanical arm that may pick up and hold items during deliveries. Additionally, vehicle 400 may also include various sensors, such as cameras, tactile sensors, and landing sensors, etc.

Figure 5:
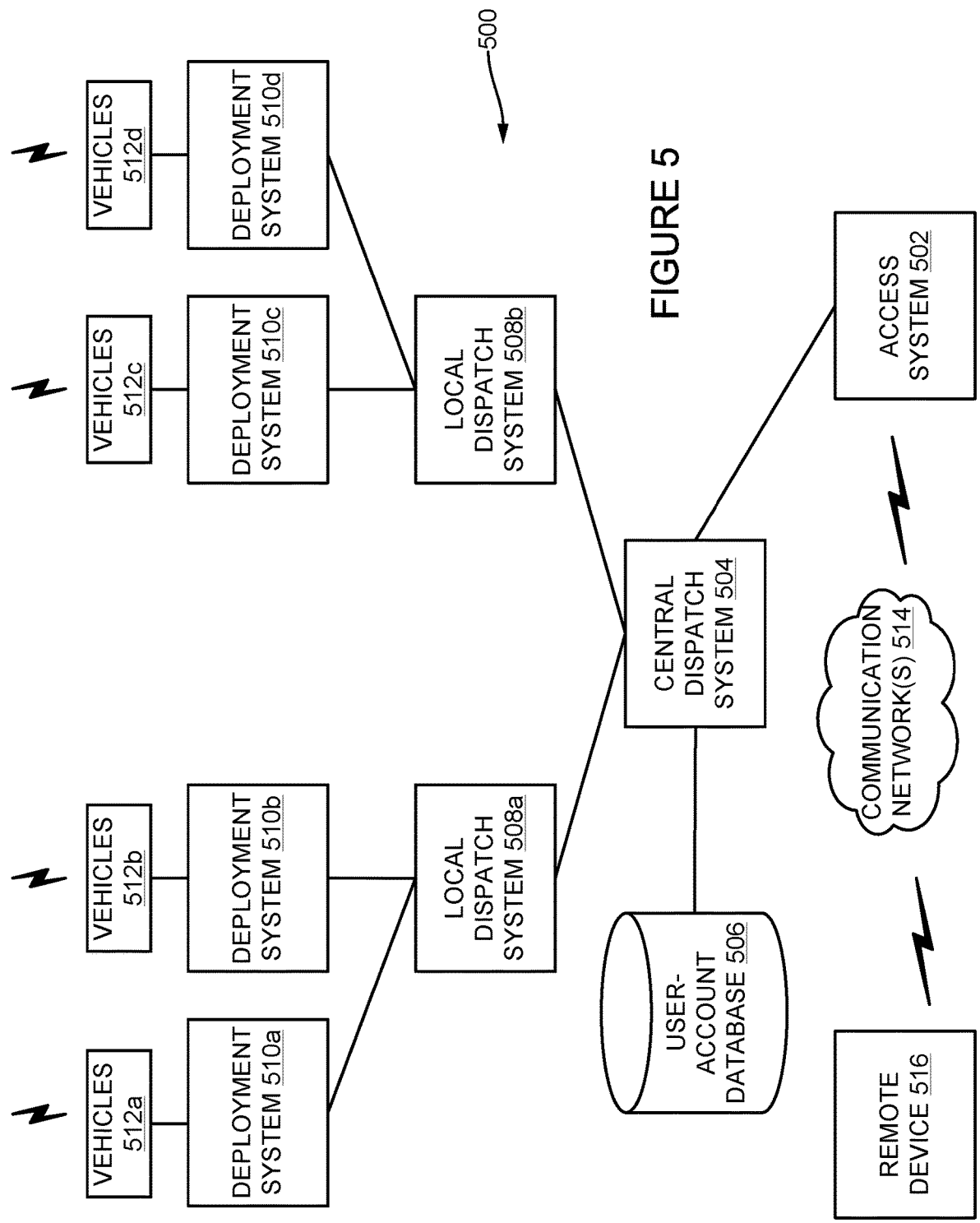
FIG. 5 illustrates an example system for organizing and dispatching a group of vehicles.

FIG. 5 illustrates an example system for organizing and dispatching a group of autonomous vehicles. More specifically, system 500 represents an example configuration of a network of stations and computing systems arranged to receive task requests that specify locations, process the requests, and dispatch vehicles to complete the tasks accordingly. Other example systems may have other configurations, including more or fewer elements.

As shown in FIG. 5, system 500 involves connections between various elements, including access system 502, central dispatch system 504, user-account database 506, local dispatch system(s) 508*a-b*, deployment system(s) 510*a-d*, vehicle(s) 512*a-d*, communication network(s) 514, and remote device(s) 516. Each element shown in FIG. 5 may represent one or more elements. For instance, access system 502 may correspond to multiple access systems in another implementation. Additionally, in other example implementations, elements may be combined or interconnected in other ways. For instance, central dispatch system 504 may be combined with access system 502 and user-account database 506 in other examples. The elements within system 500 may connect in other ways not shown in FIG. 5.

In some examples, system 500 may dispatch vehicle(s) 512*a-d* to provide services across a large geographic area (e.g., that is much larger than the travel range of any single vehicle). Vehicle(s) 512*a-d* may include various types of autonomous and semi-autonomous vehicles capable of performing different tasks. For example, vehicle(s) 512*a-d* may include ground-type vehicles (e.g., vehicle 300, robotic devices), aerial vehicles (e.g., vehicle 400), and other possible types. By having different vehicle(s) 512*a-d* available at multiple locations, system 500 may dispatch particular vehicles to perform tasks based on a vehicle's capabilities, among other factors. For example, system 500 may select a ground-type vehicle (e.g., vehicle 300) to deliver heavy packages or materials and an aerial vehicle (e.g., vehicle 400) to deliver a small package to a remote location.

Access system 502 may enable and help facilitate initial communication with system 500. For example, access system 502 may receive task requests for one or more elements of system 500 to process, organize, and dispatch vehicle(s) 512*a-d* to complete. Access system 502 may include an interface that enables operators to request and possibly control vehicle(s) 512*a-d*. As shown in FIG. 5, access system 502 may relay information to central dispatch system 504, which may further organize and coordinate vehicle(s) 512*a-d* to be dispatched. Similar to access system 502, central dispatch system 504 may correspond to a computing system or network of computing systems that can provide instructions to local dispatch system(s) 508*a-b* and/or directly to deployment system(s) 510*a-d*. To provide such functionality, central dispatch system 504 may communicate with access system 502 and other elements of system 500 via a data network, such as the Internet or a private network.

Central dispatch system 504 may coordinate vehicle(s) 512*a-d* positioned at different local dispatch system(s) 508*a-b*. For example, central dispatch system 504 may analyze the locations, availability, task assignments, and other information regarding vehicle(s) 512*a-d* to determine dispatching instructions. Similar to central dispatch system 504, local dispatch system(s) 508a-b may perform operations relating to organizing and facilitating dispatching of vehicle(s) 512a-d and may further communicate instructions to deployment system(s) 510a-d.

Deployment systems 510a-d may arrange deployment of vehicle(s) 512a-d and may also provide additional functions, such as diagnostic-related functions (e.g., verifying system functionality of each vehicle), ensuring each vehicle receives objects or other information related to instructed tasks, and/or maintaining devices or other items that are housed in the vehicle (e.g., by monitoring a status of a payload such as its temperature, weight, etc.). In some implementations, deployment systems 510a-d and their corresponding vehicle(s) 512a-d (and possibly associated local dispatch system(s) 508a-b may be strategically distributed throughout an area such as a city. For example, deployment systems 510a-d may be strategically distributed proximate to one or more pickup locations (e.g., near a restaurant, store, or warehouse).

Remote device 516 represents any device that may communicate with access system 502 and/or other elements of system 500 via communication network(s) 514. For example, remote device 516 may correspond to smartphones, applications, software, websites that may communicate with access system 502 (or a human operator operating at access system 502). In some examples, remote device 516 may enable a user to request for system 500 to dispatch a vehicle to complete a request (e.g., deliver a package). System 500 may also include user-account database 506. For a given user account, the user-account database 506 may include data related to or useful in providing services. The user data associated with each user account may be optionally provided by an associated user and/or collected with the associated user's permission.

In addition to the various elements discussed above, system 500 may place interveners (not shown) (e.g., people, robotic devices) that may repair or recover vehicles experiencing a failure. Reset tasks may be generated for a marketplace that incentivizes interveners to go to places where assistance is needed to restart dead vehicles, robots, or recover downed drones. Different tasks may be assigned to particular interveners based on intervener qualification levels.

In some examples, system 500 may operate as a hybrid delivery model that may simultaneously plan to complete deliveries using human deliverers and vehicle deliverers. For instance, the human deliverers may serve a dual role of delivering packages and being well-positioned to assist vehicles (e.g., provide remote assistance). For instance, to deliver to a grid covering an entire neighborhood, delivery vehicles may be interleaved to focus on small sections of the grid at a time with humans placed central to each group of vehicles to provide quick assistance when needed. In another example, a grid of area may be divided into long slices for each vehicle rather than separate quadrants. The vehicles may then all progress in the same direction so that a human intervener can easily be positioned to assist any failing vehicle in the group. Other example configurations involving vehicles and humans dynamically to complete deliveries may exist.

In a further example, system 500 may include one or more elements configured to oversee one or more vehicles that can be operated remotely by a device or system associated with the truck that deployed the vehicles. This way, vehicle(s) 512a-d can include some vehicles that do not require full sensing and planning systems to complete tasks. Rather, the more cost efficient vehicles may perform operations according to plans provided remotely by a system or operator positioned at the deploying truck or another location. For example, a high-bandwidth link to the truck may be leveraged so that only a low-bandwidth link to each delivery vehicle is needed. In some instances, the deployment truck may also have its own gantry vehicle or robot to load up the delivery vehicle with packages before the vehicle is deployed for delivery. Additionally, the truck may launch a single vehicle, multiple vehicles, or different types of vehicles.

In further examples, system 500 may plan routes for a given deploying truck and optimize the routes based on expected times for delivery vehicles to deliver a package and return to the truck. For example, the truck may be configured to continually move through an area, dropping off and picking up vehicles as it goes. Such a system may be particularly advantageous when individual delivery vehicles are particularly slow and/or when certain delivery locations may be difficult to reach. A control system may be responsible for dynamic simultaneous adjustment of route plans for both the individual delivery vehicles and the deploying truck.

Figure 6:
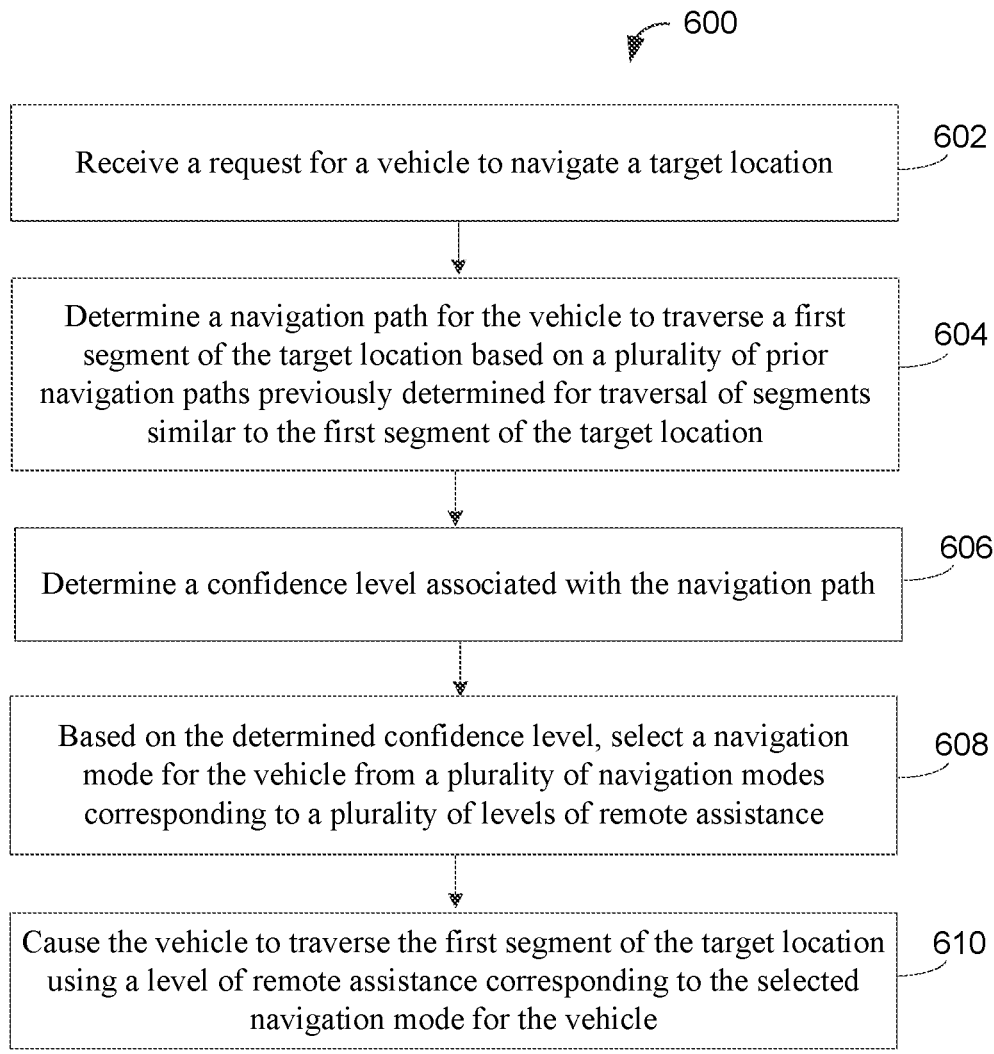
FIG. 6 is a flowchart that shows an example method.

FIG. 6 is a flowchart illustrating method 600, which represents an example method that may include one or more operations, functions, or actions, as depicted by one or more of blocks 602, 604, 606, 608, and 610, each of which may be carried out by a computing system. In some examples, some or all of the functions may be carried by a computing system located on a vehicle, such as vehicles 512a-d. In further examples, some or all of the functions may be carried out by a computing system located remote from a vehicle, such as a computing systsem that is part of central dispatch system 504. Those skilled in the art will understand that the flowchart described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may perform one or more blocks of method 600.

At block 602, method 600 may include receiving a request for a vehicle to navigate a target location. For instance, the request may be a delivery request for the vehicle. A computing system, such as a control system (e.g., computing system 100) of a vehicle (e.g., vehicle system 200, vehicle 300, vehicle 400) may receive a delivery request to deliver an object, such as a package, materials, or other objects to the target location. In some instances, the request may instead be to complete a different type of task (e.g., object pick up) at the target location. The request may also include information to enable a computing system to formulate a strategy in order to fulfill the request. As an example, the computing system may receive a request from a company to deliver an item or items to the home address of a customer. Alternatively, another example may be a request from a group of people to be picked up and transported to another location by a vehicle capable of safely transporting people. Other example task requests at target locations are possible.

Within examples, the request may come from a variety of sources, including from devices and/or software used by people or companies. For example, a user may send an email request, a text request, or some other form of wireless communication requesting for a task to be completed. In another example, the computing system may receive the request from a platform associated with a company, such as a request from the company's sales software. Each request may specify other information useful to the computing system, such as a target address, order details, and recipient information (e.g., name, phone number, email address), among other possible information. For example, a delivery order may further include special instructions related to completing the task, such as a specific instruction for placing a package at the target location (e.g., near a backdoor).

The target location may depend on the task requested. In particular, the target location may represent a geographic location. For example, a target location may correspond to a house or other type of building at a given address. Examples may include single-family homes, multi-family homes, condominiums, townhouses, cooperatives, and parks, among other possibilities. In other examples, a target location may correspond to other types of areas or destinations, such as commercial locations, agricultural locations or buildings (e.g., on a farm), outdoor areas, medical buildings, educational buildings, government buildings, and industrial locations, among others possibilities. In some examples, a target location may represent the current position of a person or company that is indicated to receive or provide an object associated with the delivery or pickup. In another example, a given target location may correspond to a future position of the consumer or company receiving the delivery. Within examples, similar locations to a target location may share features that a vehicle may find familiar during navigation across the similar locations.

The computing system configured to receive requests to navigate target locations can vary within examples. For instance, the requests may be sent to a computing system configured to organize and dispatch a group of vehicles to complete the requests. For example, the computing system may correspond to system 500 or a similar distribution network that can receive many requests and further distribute each requests to other computing systems (e.g., control systems of delivery vehicles) to perform the deliveries. The dispatching computing system may distribute requests to individual delivery vehicles to improve the organization and efficiency of the deliveries. For instance, the computing system may send requests for deliveries that are located closely together to the computing system or systems of delivery vehicle(s) organized to complete deliveries in that general location.

In another example, a request may arrive at the control system of a delivery vehicle directly. For example, a central system may cause requests to arrive at the control systems of vehicles positioned in geographic regions close to the packages requiring delivering and/or pickup. A vehicle's control system may be located on the vehicle and/or located remotely from the vehicle. In a further example, the control system may access information that includes sensor data and navigation information obtained based on the performance of similar tasks from cloud memory storage. As a result, a vehicle's control system may develop information to learn how to perform tasks at given locations based on the performance of those tasks by other vehicles.

In a further example, the receiving computing system may process each request to categorize the target locations to help facilitate organization and completion of tasks. As an example, a computing system may group requests based on addresses and building types to potentially improve the confidence building processes associated with the control systems of the delivery vehicles. For instance, vehicle control systems may analyze delivery requests for residential houses located in the same area in a similar manner since the houses may share common features (e.g., common streets, driveways, and front door positions). This way, when a new delivery or pick up request arrives that has attributes similar to previously completed requests, such as the same building type or neighborhood, a delivery vehicle's control system may utilize information from the previously completed requests (e.g., navigation routes, surface identifications) to assist in building confidence and working towards completing that task with minimal remote assistance.

In another example, requests may be sent to a computing system network that maintains the requests within cloud type storage. As such, the requests may be organized based on type (e.g., delivery or pickup), address, and/or size of delivery, among other possibilities. With the requests located in the cloud, control systems of various delivery vehicles may access the set or a subset of the requests to initiate operations.

At block 604, method 600 may include determining a navigation path for the vehicle to traverse a first segment of the target location. The navigation path may be based on previously determined navigation paths for a vehicle (e.g., of same or similar vehicle type) to traverse segments similar to the first segment of the target location. The vehicle may collect sensor data representative of a first segment of the target location from one or more sensors on the vehicle, such as a depth sensor, a visual imager, or a video camera. Prior navigation paths determined for similar segments of the same location or different locations may then be used to generate a navigation path for the vehicle. In some examples, a control system may explicitly identify similar segments based on environment layout, topography, surface type, and/or other factors. In other examples, a path-planning model may be trained with prior navigation paths determined for similar segments. The model may then be used to generate a navigation path for the first segment of the target location.

In further examples, a distribution of possible navigation paths may be generated for the first segment of the target location. In particular, the model may be a probabilistic path-planning model that generates several possible navigation paths and associated probabilities. The probabilities may represent the odds that the corresponding paths are the optimal path, or the path that would be chosen by a remote human operator to traverse a particular segment. As a vehicle's autonomous control system becomes more confident in how to traverse a particular type of location, the distribution of possible navigation paths may become narrower, and eventually may reduce down to a single navigation path.

A segment of the target location may be identified as a discrete portion of the location. In some examples, one or more images of the target location may be processed using image segmentation to divide the location into segments. Separate segments may be identified as having different topographies and/or surfaces materials. For instance, a delivery location may be divided into three segments corresponding to a paved driveway, a concrete sidewalk, and a wooden staircase. In other examples, a location may be divided into segments of uniform length, area, or expected traversal time. A path-planning model may be run separately on each segment to determine a separate navigation path and associated confidence level for each segment.

Input data for the path-planning model may include visual and/or depth sensor data from one or more sensors on the vehicle. In additional examples, sensor data collected by one or more other vehicles and/or data previously stored in a map of the environment may be used as well or instead. Other factors may be also input into a path-planning model to influence the navigation path generated by the model. In some examples, vehicle locomotive capabilities (e.g., wheeled, legged, aerial) may be an input. In additional examples, package properties (e.g., weight or size) of a package carried by the vehicle may be an input. Additionally, the system may also gather other types information that may assist the system in determining a navigation path.

In some examples, the vehicle's control system may check and analyze the weather at the target location. The system may access weather information via another device, database, website, and/or using sensors positioned on the vehicle when the vehicle is within range from the target location to gather an accurate reading. The system may check the weather since bad weather may make completing a task, such as a package delivery, more difficult for a control system which relies on vehicle sensor data. For example, the control system may analyze the prior and current precipitation level and temperature at a target location to determine if navigation paths may be more difficult to travel or if the weather may interfere with the vehicle's sensors.

In further examples, the navigation path may be generated using a generative adversarial network (GAN). The GAN may include two competing models, such as two separate neural networks. A path-planning model may generate navigation paths or distributions of navigation paths for segments of locations (e.g., using vehicle sensor data as an input). A separate discriminator model may be trained to distinguish between operator-provided navigation paths and autonomously generated navigation paths. Output from the discriminator model may be used to help train the path-planning model to generate navigation paths that resemble navigations paths that would be selected by an operator. Once the path-planning model is properly trained for a particular type of segment, the path-planning model may be relied on to generate navigation paths without operator assistance.

At block 606, method 600 may include determining a confidence level associated with the navigation path. The confidence level may represent a likelihood that the determined navigation path will allow the vehicle to autonomously traverse the first segment of the target location.

In some examples, the confidence level may be determined using statistical analysis on the output generated by a path-planning model. For example, the path-planning model may generate a distribution of possible navigation paths for a segment of a location. A broader range of possible navigation paths may be associated with a lower confidence level. In some examples, the model may also generate an associated probability with each possible navigation path. A navigation path having the highest associated probability may be selected by the model for the vehicle to traverse a segment of a location. The confidence level may then be determined based on the probability associated with the selected navigation path. In further examples, the confidence level may be determined using a separate model which predicts whether or not a particular navigation path (autonomously generated or provided by an operator) is likely to be problematic. For instance, the model may output a likelihood that a generated navigation path will allow a particular delivery vehicle to successfully traverse the segment of the location.

At block 608, method 600 may include selecting a navigation mode for the vehicle from a plurality of navigation modes corresponding to a plurality of levels of remote assistance. As discussed above, the control system may determine a confidence level that represents an estimation of the success rate associated with the control system autonomously controlling the vehicle to complete a requested task (e.g., perform the delivery). In some situations, the control system may determine a low confidence level and select a navigation mode that involves requesting remote assistance to assist the vehicle to complete the task. For example, the control system may determine that the confidence level is below a predefined confidence level and, as a result, submit a request to a remotely positioned operator to assume control of the vehicle. This may likely occur when the delivery vehicle encounters a new delivery location that does not resemble other previously encountered delivery locations and/or when the delivery vehicle encounters a location that is inherently very difficult.

On the other hand, in some situations, the control system may determine a medium or high confidence level and determine a control strategy involving the control system autonomously controlling at least some aspects of the vehicle while the vehicle completes the requested task. For example, the control system may determine that its confidence level is above a predefined confidence level. In this case, the system may select a navigation mode that involves autonomously controlling the vehicle without remote assistance.

At block 610, method 600 may include causing the vehicle to traverse the first segment of the target location using a level of remote assistance corresponding to the selected navigation mode for the vehicle. For instance, if the confidence level is low, a request may be sent to a remote operator to tele-operate the vehicle to traverse the first segment. If the confidence level is high, the vehicle may instead autonomously traverse the first segment using the navigation path generated by the path-planning model.

In some implementations, the control system may determine a new confidence level at various steps while the vehicle completes the delivery request. For example, a separate navigation path and confidence level may be determined for each of several discrete segments of a target location. This may enable the control system to adjust its strategy for completing the delivery at different points of the process. For example, the control system may initially control the vehicle at the target location, but encounter an unfamiliar segment (e.g., a physical object blocking the path) that the control system is unable to overcome. As a result, the control system may adjust its confidence level from high to low and request remote assistance to help overcome the obstacle. The confidence level may also be adjusted when the vehicle encounters a known-good or known-bad scenario. For instance, a delivery location with a dog blocking the path may be given a low confidence level even if the scenario would otherwise be easy for the vehicle to traverse.

In some implementations, deliveries to a particular delivery location by delivery vehicles may transition from remote operation controls provided by remotely-positioned human operators to autonomous controls by control systems of the delivery vehicles over time. More specifically, initial deliveries to the particular location may require controls from a human operator due to unknowns associated with the location. For instance, the operator may use sensor data, such as audio and video from the delivery vehicle to provide control instructions to the delivery vehicle to complete the delivery. The operator may determine a variety of information that the vehicle's control system may initially fail to select properly, such as which surfaces that the delivery vehicle should travel along and where to actively deliver and position the object, among other possible decisions. In a further example, the operator may even walk along with the delivery vehicle while providing instructions to assist in completing the delivery. As such, over time, the vehicle's control system may actively learn how to perform deliveries to that location based on acquiring sensor data and information from the operator's controls provided during the prior deliveries to the location.

In some examples, navigating a particular location or group of similar locations may progress through tiers of different levels of remote assistance. As an example, different tiers may include a remote operation tier (first level), setting waypoints (second level), confirming waypoints (third level), and full autonomous control by the vehicle's control system or another computing system throughout the delivery operation (fourth level). Other examples may include more or less tiers with different amounts of remote control and/or computer control. Each level indicated in the above example will now be discussed in further detail.

As discussed above, delivery to a delivery location using a vehicle capable of partial and full autonomous operation may change as more information is acquired by the vehicle's control system over time. In the beginning, the control system may rely completely or at least substantially on instructions provided by a human operator. This initial tier of operation control may correspond to the first level mentioned above. The operator may make decisions that would be difficult for the control system to initially determine, including what navigation path to use. For instance, the operator may select paths for the delivery vehicle that avoid damaging property (e.g., using a sidewalk rather than traveling through grass or a garden). In some example, the operator may also control the speed and other aspects of navigation of the delivery vehicle such that the vehicle completes the delivery properly.

A second level of remote operation in the example tier system initially discussed above may involve an operator setting waypoints for the control system of the delivery vehicle to follow. A waypoint, also known as a landmark, may correspond to a reference point in a physical space that can be used for navigation purposes. Waypoints can correspond to sets of coordinates that identify different points in the physical space. A waypoint may be described in various ways within examples, such as coordinates that include longitude and latitude. In some examples, such as those involving aerial or non-aerial delivery vehicles, waypoints may also include altitude information. A delivery vehicle may use a navigational system (e.g., GPS) to monitor and follow waypoints.

Rather than full remote control, a remote operator may only be asked to set one or several waypoints to help guide the vehicle. A control system of the delivery vehicle may control the delivery vehicle to the extent of causing the vehicle to travel to each waypoint until completing the delivery. In some instances, the operator may monitor and possibly assist the control system during navigation between waypoints. For example, the operator may override control of the delivery vehicle in a situation where the control system fails to properly follow the desired path set forth by the waypoints. This way, the operator may prevent unwanted operation by the delivery vehicle (e.g., keep the delivery vehicle on the correct path using proper surfaces). This tier may be used when the control system determines that the confidence level is greater than a first predefined confidence level threshold and less than a second predefined confidence level.

In some examples, a potential third level may involve the remote operator confirming waypoints generated autonomously by a control system of the vehicle. In particular, the control system of the vehicle may navigate autonomously, while also transmitting waypoints that an operator may check and approve the progression of travel by the vehicle.

The fourth level in the example tier system may involve the delivery vehicle's control system autonomously completing the delivery process. At this point, the control system may have acquired navigation information from the operator previously controlling the vehicle at the same or similar locations as well as navigation information acquired during the other levels (e.g., second level, third level).

Transitioning between different tiers of remote assistance may depend on the confidence level associated with a location. Additionally, the control system may transition between tiers at different points of performing a desired task. For example, the control system may navigate the vehicle to the target location, but request assistance to complete the delivery. The control system may also transition between tiers in between performing different tasks (e.g., multiple deliveries).

In another example, the control system may also make predictions about expected delivery times to different types of locations and feed the predictions to a centralized planner that may dynamically balance workload across a number of vehicles. For instance, a vehicle may have multiple deliveries to make and determine a route that efficiently completes all of the deliveries (e.g., minimizes travel).

FIG. 7A, FIG. 7B, FIG. 7C, FIG. 7D, and FIG. 7E illustrate an example scenario for navigating a vehicle. In particular, scenario 700 shows an example implementation of a vehicle determining delivery confidence for completing deliveries to house 702. Scenario 700 involves a vehicle adjusting its delivery strategy with regards to a residential area, but other example scenarios may include other types of areas, such as commercial, outdoor, or industrial settings. Further, although scenario 700 involves a vehicle performing deliveries to house 702, other example scenarios may involve a vehicle performing other tasks (e.g., package pickup or people transportation).

Figure 7A:
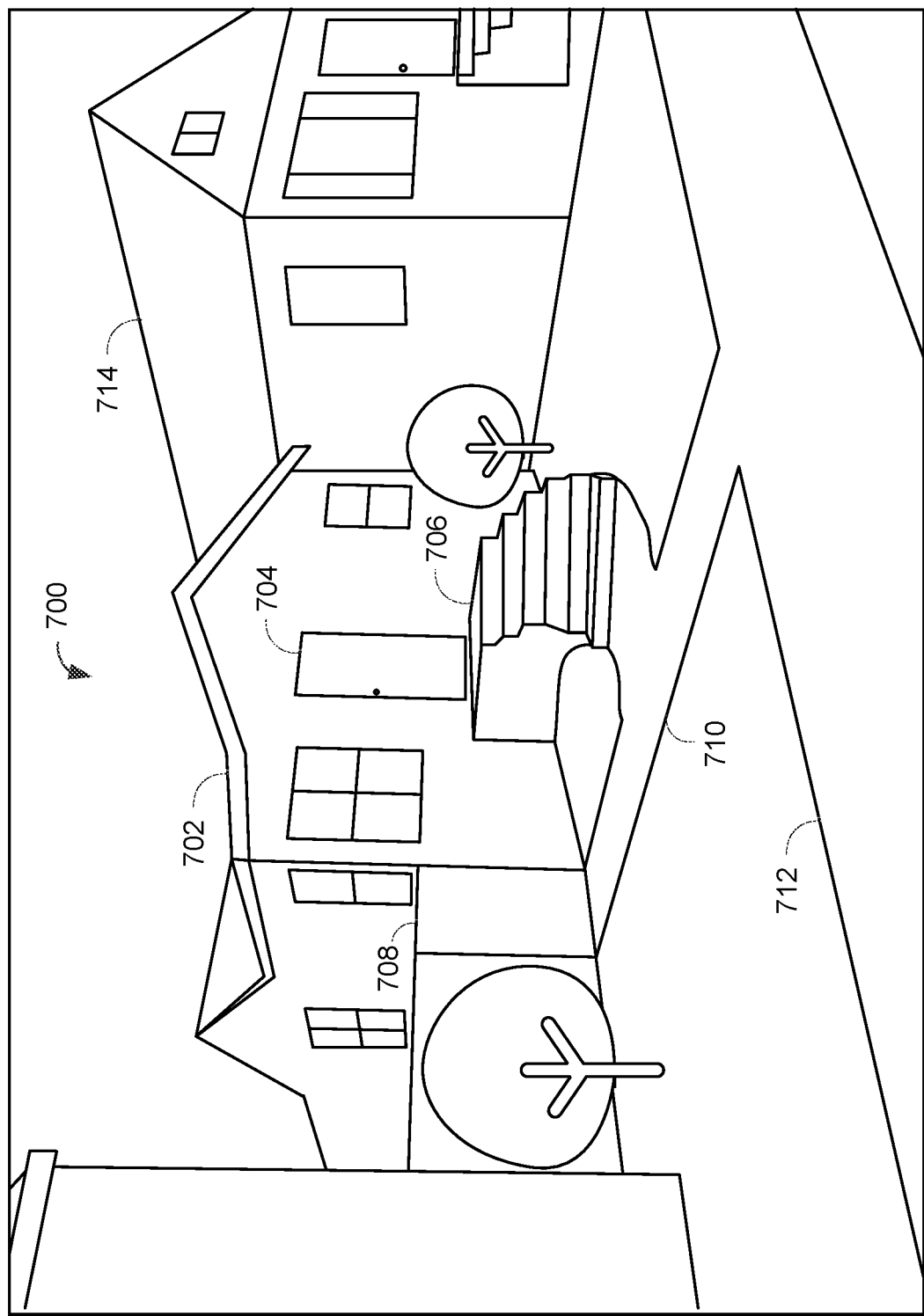
FIGS. 7A, 7B, 7C, 7D, and 7E illustrate an example scenario for navigating a vehicle in a residential area.

FIG. 7A illustrates a general layout of the residential area depicted in example scenario 700. As shown, the residential area includes multiple houses (e.g., house 702, house 714) positioned along road 712. House 702 further includes elements often associated with a property in a residential area, including door 704, outdoor stairs 706, fence 708, and walkway 710 leading from outdoor stairs 706 to road 712. As such, house 702 represents an example house that may correspond to a potential delivery location, but other delivery locations may have other configurations and layouts. For instance, another example delivery location may be an outdoor space without a physical building.

Figure 7B:
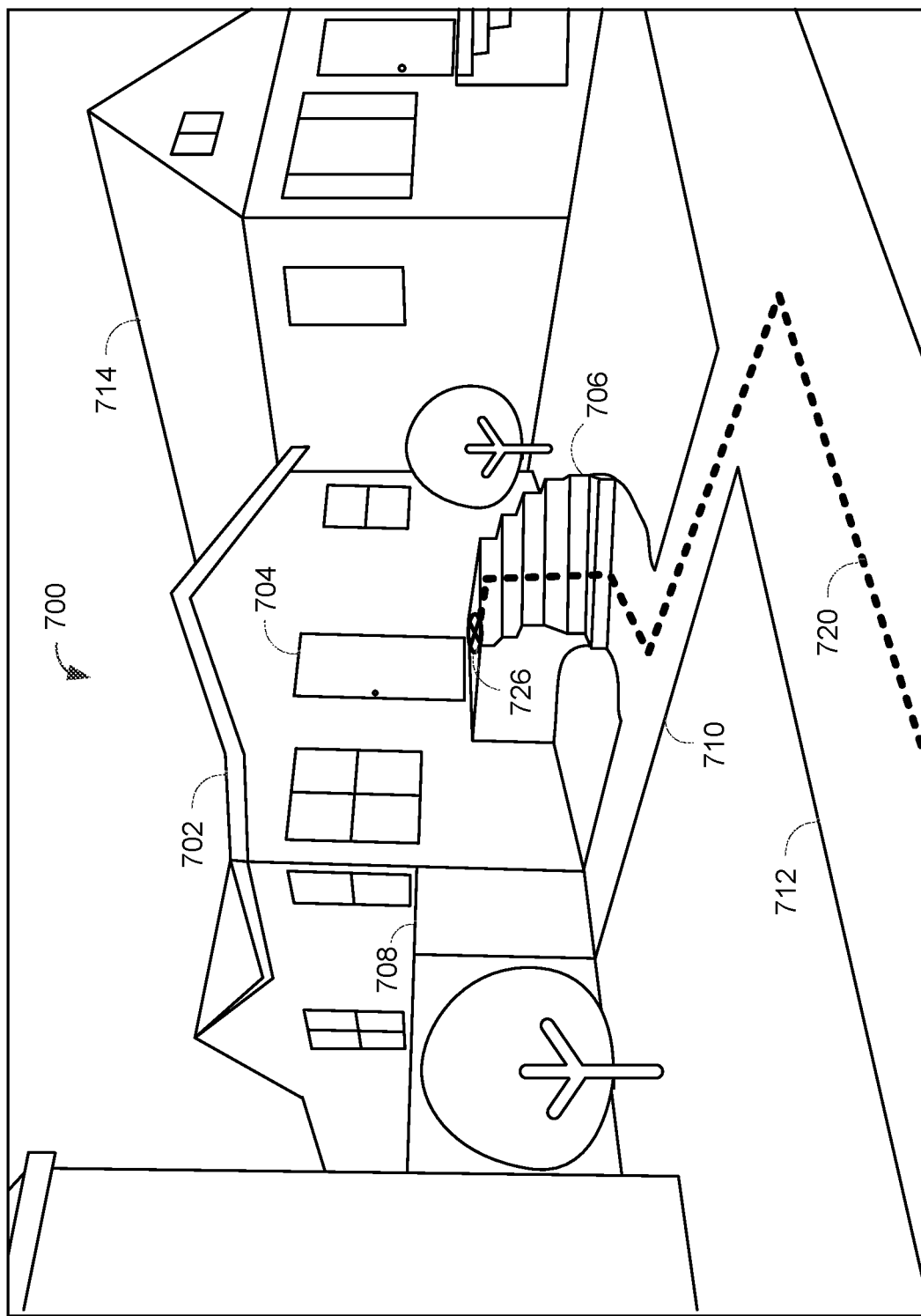

FIG. 7B shows navigation path 720 that a delivery vehicle may initially follow using remote assistance. In particular, as discussed above, a remotely-positioned human operator may provide instructions to a delivery vehicle to navigate the vehicle along road 712, walkway 710, and staircase 706 until the vehicle reaches drop-off location 726 and completes the delivery. This way, the operator may navigate vehicle along navigation path 720 to complete one or more initial deliveries to house 702 while a control system of the delivery vehicle obtains and stores the information for subsequent use at house 702 or similar delivery locations (e.g., house 714).

Figure 7C:
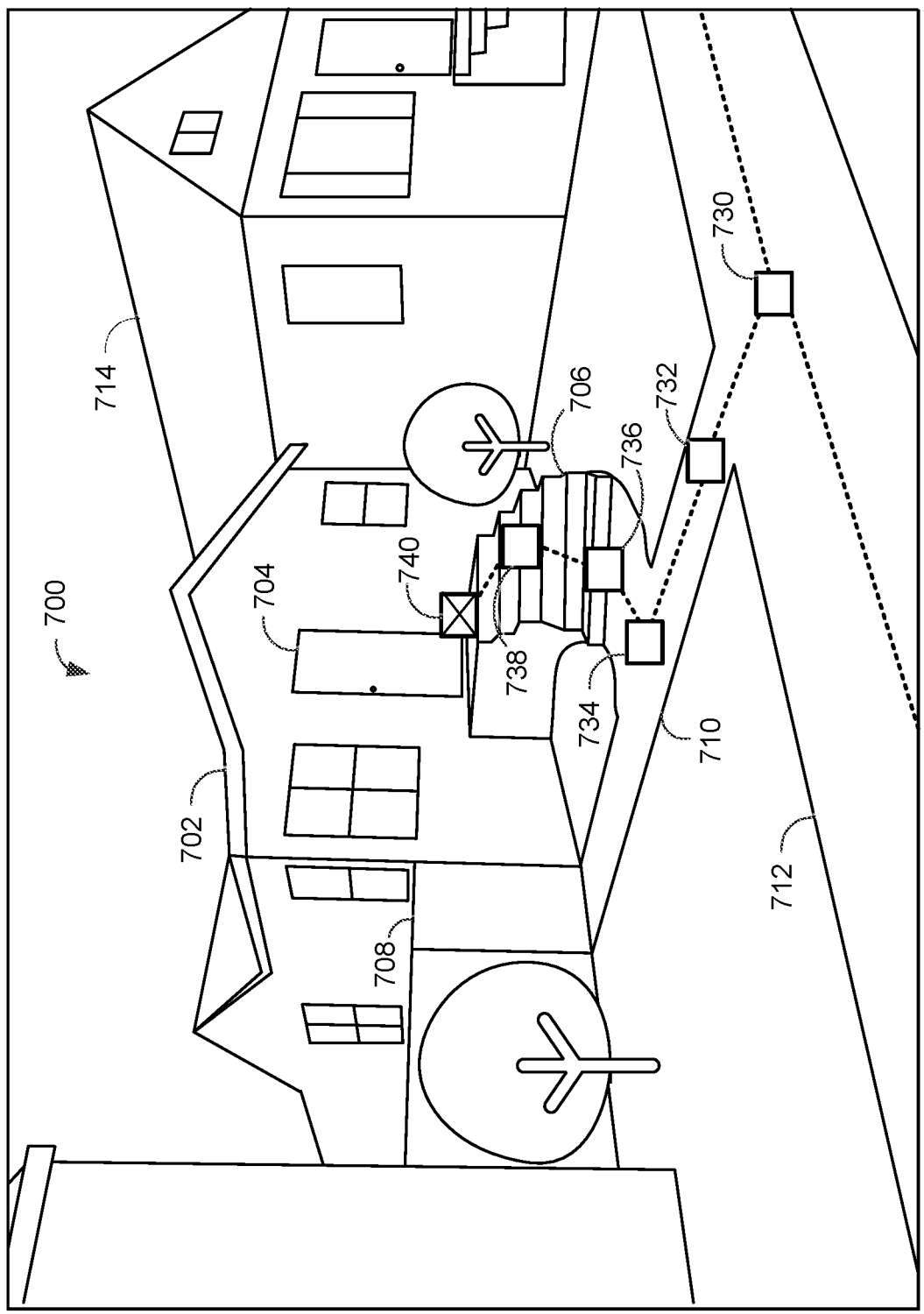

FIG. 7C shows example waypoints that the delivery vehicle may use when performing a delivery at house 702. As discussed above, a control system of a delivery vehicle may assume more control of navigation of the vehicle after the system obtains relevant navigation information, such as navigation paths provided by a human operator for performing a delivery at the location or a similar location. After acquiring information, the control system may determine that its confidence level associated with successfully performing the delivery still indicates that the system requires some amount of remote assistance to perform the delivery. The control system may request the operator to provide assistance in the form of waypoints that the system may follow to complete the delivery. As shown in FIG. 7C, waypoints 730, 732, 734, 736, 738, and 740 represent example waypoints that an operator may set for a vehicle's control system to use during the delivery. In particular, the vehicle's system may navigate the vehicle while traversing each of the waypoints to complete the delivery.

In some examples, an operator may set the waypoints in response to receiving a request for waypoints from the control system of the vehicle and/or during the initial delivery at house 702 when the operator may have full control of vehicle.

Figure 7D:
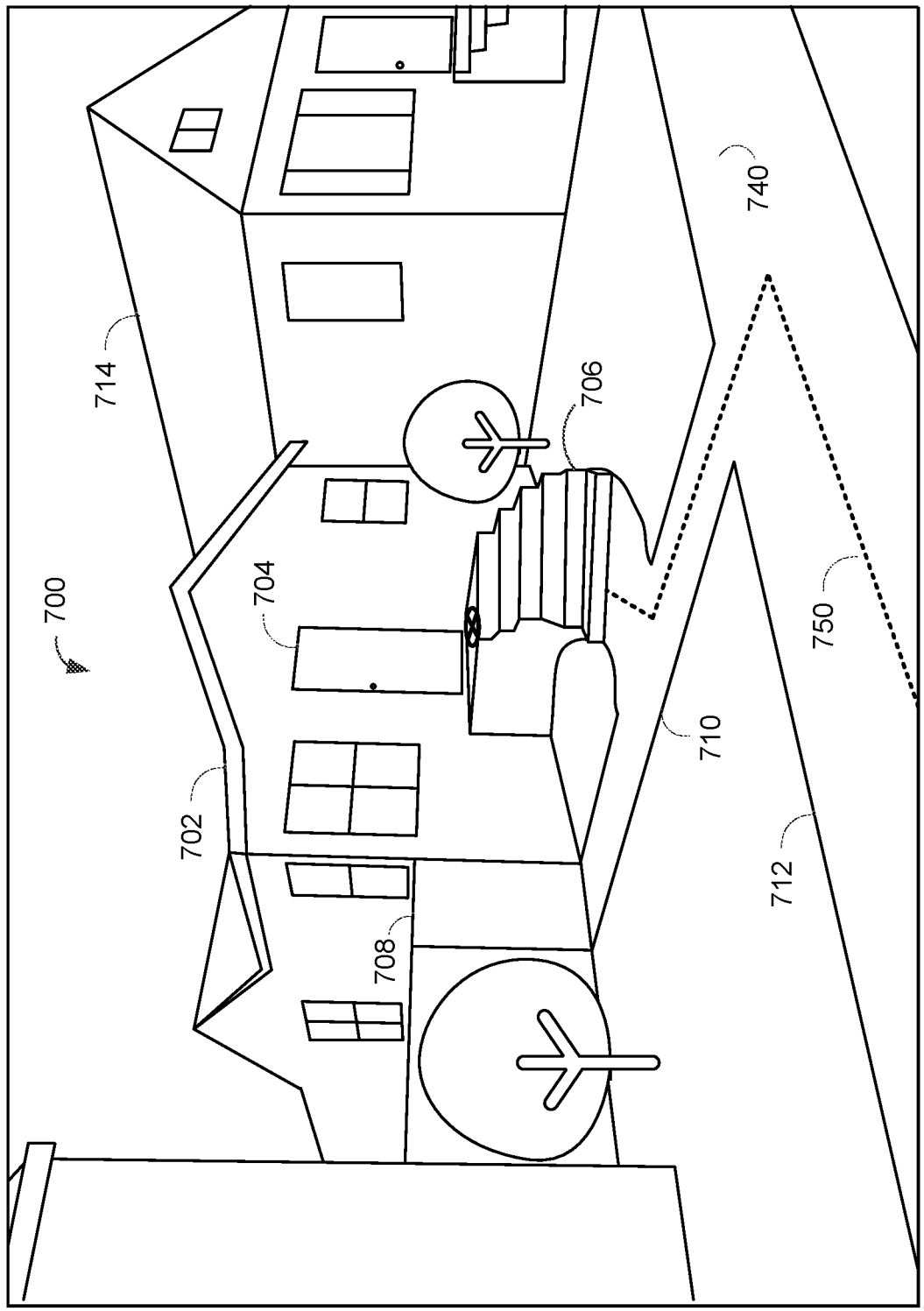

FIG. 7D shows navigation path 750 that a delivery vehicle may use while navigating to house 702. After acquiring enough information to improve its confidence with performing deliveries at house 702 or similar houses, the vehicle's control system may autonomously follow navigation path 750. As shown, navigation path 750 resembles navigation path 720 used by an operator to complete a prior delivery. In particular, this shows how the vehicle's control system may be influenced by prior instructions provided by an operator when determining how to complete a delivery or other task autonomously.

In some examples, a control system of the delivery vehicle may process sensor data representing the area around house 702 to segment the navigation problem into subtasks. In particular, three separate segments corresponding to road 712, walkway 710, and staircase 706 may be identified. A separate navigation path and associated confidence level may be determined for each segment. For instance, navigation path 750 may be determined by running a path-planning model separately on road 712 and walkway 710. In each case, the system may determine that it has enough confidence in an autonomously generated navigation path 750 to allow the vehicle to proceed autonomously without remote assistance.

Figure 7E:
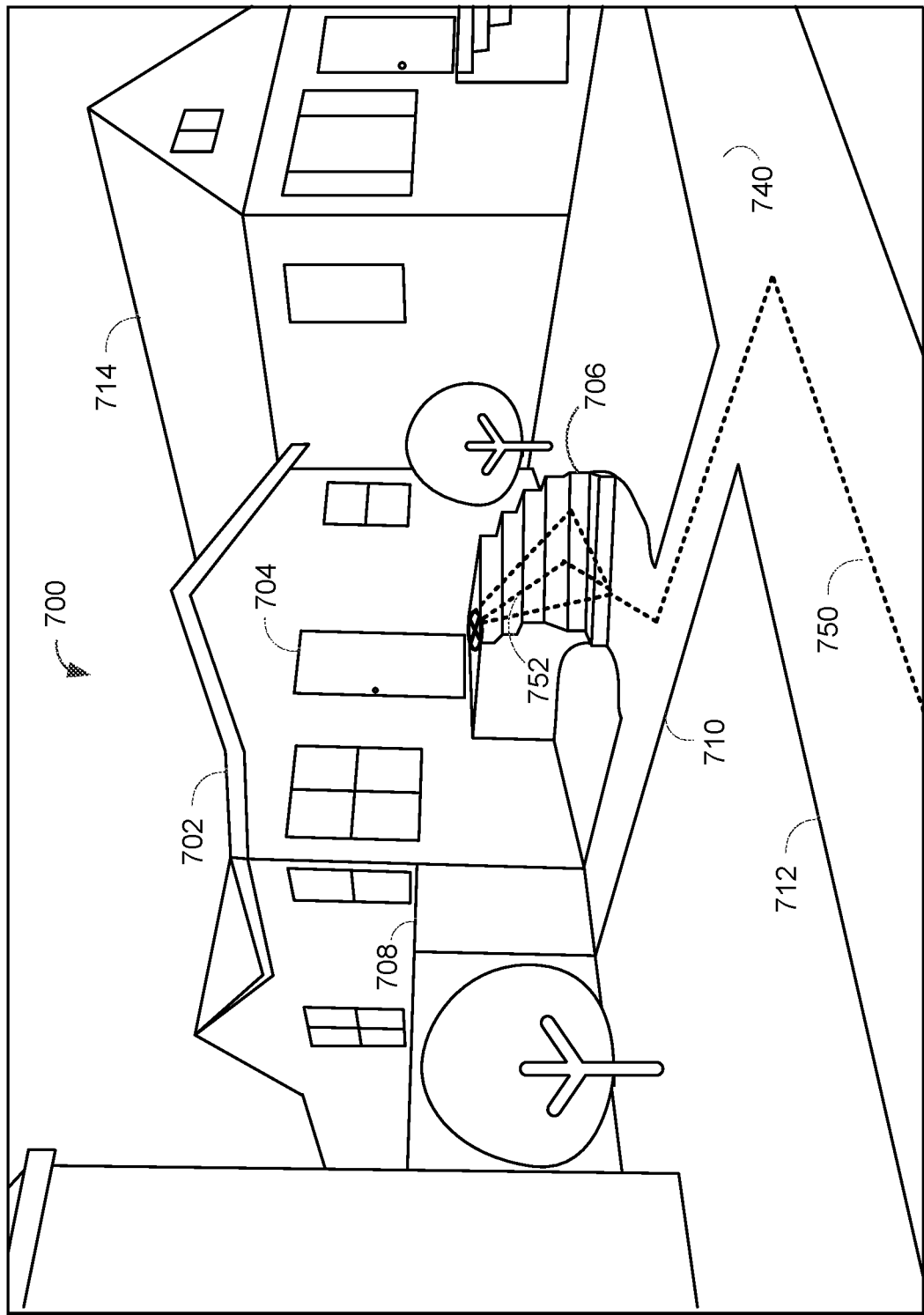

FIG. 7E shows a distribution of navigation paths 752 that a control system may determine to traverse a segment of a delivery location. More specifically, a probabilistic path-planning model may generate each of the three possible navigation paths shown within the distribution 752. In some cases, each navigation path may have an associated probability indicating that it is the optimal path. For instance, in this example, each of the three possible navigation paths for traversing staircase 706 may have a 33.33% associated probability. Based on this output from the model, a control system may determine that it does not have enough confidence to autonomously navigate staircase 706. The delivery vehicle may then fall back to using remote assistance to navigate this segment. This example may indicate that less prior navigation was available for staircases similar to staircase 706 than for road 712 and walkway 710. The example may also indicate that a diverse variety of paths were selected by remote operators when navigating staircases like staircase 706, making it more difficult for a control system to autonomously generate a navigation path.

Figure 8:
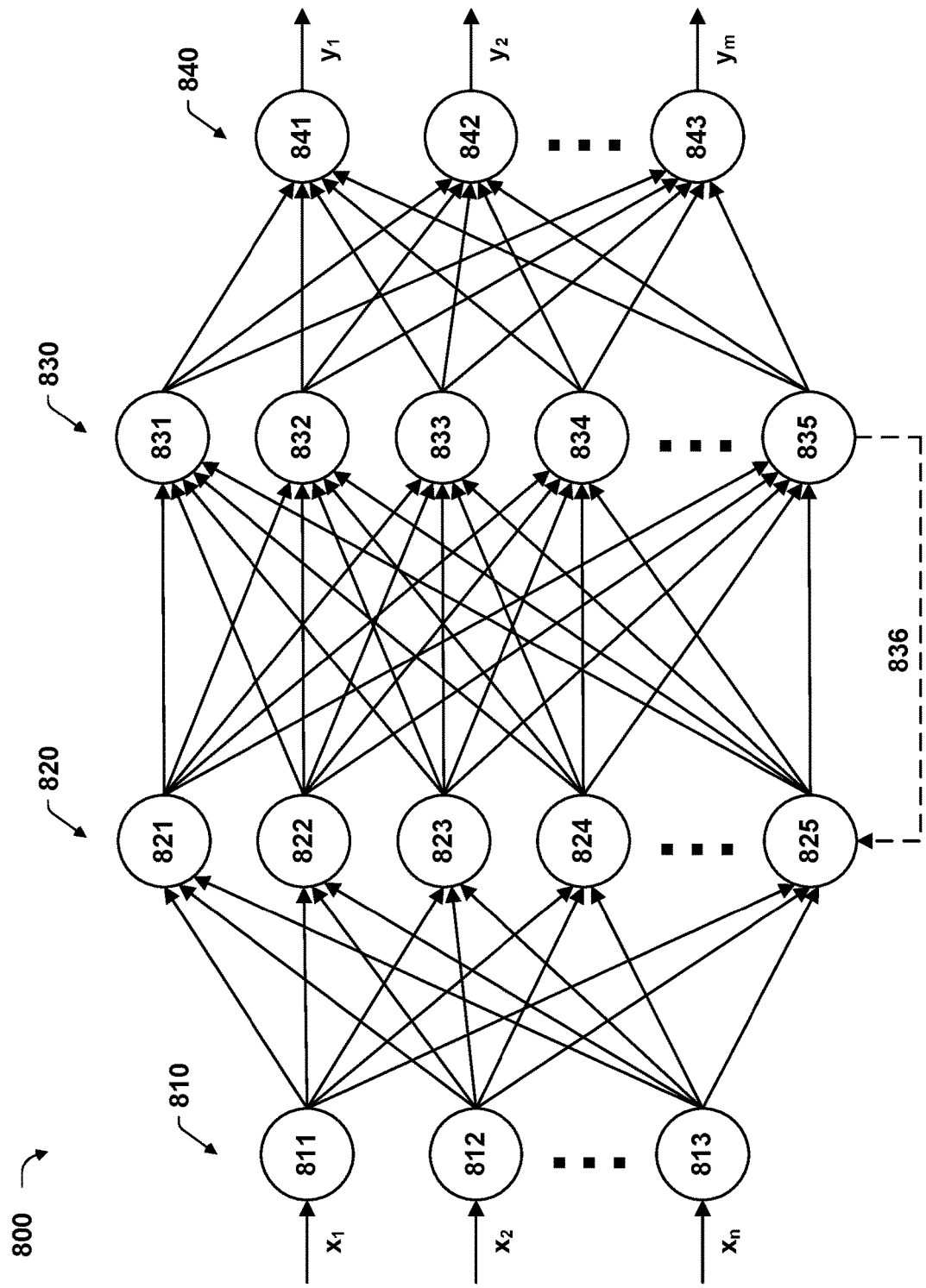
FIG. 8 illustrates an example artificial neural network.

FIG. 8 illustrates an example structure of an ANN 800 that may be used to determine a navigation path for a segment of a target location. ANN 800 may include input nodes 811 and 812 through 813 that form part of input layer 810 of ANN 800 and are configured to accept inputs $x_1$ and $x_2$ through $x_n$, respectively. In some embodiments, the number of inputs n may be equal to or greater than the size/dimension of vehicle sensor data representing the segment of the target location. For example, the sensor data may be a red, green, blue, plus depth (RGB-D) image data comprising M columns and N rows of pixels. Each of the M×N pixels may be associated with four different values: a red value, a green value, a blue value, and a depth value. Accordingly, ANN 800 may be configured to take as input n=M×N×4 or more inputs. In another example, the sensor data may be provided to ANN 800 in the form of a 3D virtual model comprising a height M, a width N, and a depth K. Each element (e.g., pixel) of the 3D model may be associated with three different values, a red value, a green value, and a blue value. Accordingly, the ANN 800 may be configured to take as input n=M×N×K×3 or more inputs. In further examples, ANN 800 may accept the sensor data formatted in different ways. In some embodiments, ANN 800 may additionally consider other inputs which are herein discussed and may thus accept more inputs than the size of the sensor data dictates.

ANN 800 may additionally include a plurality of hidden nodes that form part of one or more hidden layers 820 and 830. Hidden nodes 821, 822, 823, and 824 through 825 may form first hidden layer 820 while hidden nodes 831, 832, 833, and 834 through 835 may form second hidden layer 830. In some examples, ANN 800 may include additional hidden nodes and additional hidden layers not shown herein. The number of hidden nodes and hidden layers may be determined empirically during training of ANN 800 to achieve an ANN that determines navigation paths with a satisfactory confidence level.

Notably, the terms "hidden node" and "hidden layer" are used herein to designate nodes and layers, respectively, located between the input and output layers of the ANN. These and similar terms are not to be construed as implying that values, functions, or other properties associated with the hidden nodes or layers are necessarily unknown or hidden.

ANN 800 may further include output nodes 841 and 842 through 843 that form part of an output layer 840 of ANN 800. Output nodes 841 and 842 through 843 may be configured to provide outputs $y_1$ and $y_2$ through $y_m$, respectively. In some embodiments, the output nodes may correspond to a sequence of (x,y,z) coordinates to specify the determined navigation path. The navigation path may also be specified in other ways. As another example, the output nodes may correspond to a sequence of vectors indicating a direction of travel from the previous output node.

The nodes of ANN 800 may be connected with one another, as illustrated by the arrows in FIG. 8. For example, input nodes 811-813 may be connected to hidden nodes 821-825 of the first hidden layer 820 (i.e., input layer 810 may be connected to hidden layer 820), hidden nodes 821-825 may be connected to hidden nodes 831-835 of the second hidden layer 830 (i.e., hidden layer 820 may be connected to hidden layer 830), and hidden nodes 830-835 may be connected to output nodes 841-843 (i.e., hidden layer 830 may be connected to output layer 840). In some embodiments, each node of a layer may be connected to each node within a subsequent layer (e.g., node 824 may be connected to each of nodes 831-835). Alternatively, some nodes within a layer may be unconnected to one or more nodes within a subsequent layer.

In further embodiments, nodes within a layer may be connected back to nodes within a previous layer or within the same layer. For example, node 835 within layer 830 may be connected to node 825 within prior layer 820 by way of connection 836. In another example, node 835 within layer 830 may be connected to at least one of nodes 831, 832, 833, or 834 within layer 830 (not shown). Thus, ANN 800 may include feedback that creates internal state within the network. This type of ANN may be referred to as a recurrent artificial neural network (RANN). Notably, an ANN without any feedback paths may be referred to as a feedforward artificial neural network (FF-ANN).

FIG. 9A illustrates the structure and connections of an example node 950 of ANN 800. In particular, each connection between nodes of ANN 800 may be associated with a respective weighting value. Each of inputs $a_1$ and $a_2$ through $a_k$ may be associated with corresponding weighting values $w_1$ and $w_2$ through $w_k$, respectively. Node 950 may operate by first taking the sum of the respective products of each input multiplied by the corresponding weighting value, as represented by summing junction 952. Summing junction 952 may compute the sum $\varphi = w_1 a_1 + w_2 a_2 + \ldots + w_k a_k$. The sum $\varphi$ may then be passed through an activation function 954 to produce the output of node 950. Example activation functions are illustrated in FIGS. 9B, 9C, and 9D. FIG. 9B illustrates a linear activation function where the node output is linearly proportional to the sum $\varphi$. FIG. 9C illustrates a Gaussian activation function where the node output is normally distributed along a bell curve according to the sum $\varphi$. FIG. 9D illustrates a sigmoidal activation function where the sum $\varphi$ is mapped to a bounded range of node outputs.

In some embodiments, ANN 800 may be or may include therein aspects of a convolutional artificial neural network (CANN). Accordingly, the activation function 954 may be a rectifier function (i.e., $f(x) = \max(0, x)$). When all nodes within a given layer utilize the rectifier function, the given layer may be said to include a Rectified Linear Units (ReLU) layer. Additionally, pooling layers (i.e., downsampling layers) may be included between layers 910, 920, 930, and 940. Further, when ANN 800 is or includes a CANN, one or more of the hidden nodes may represent feature filters configured to filter the input sensor data for specific features (e.g., vertical lines, horizontal lines, curves, edges, etc.). The filters may become increasingly complex, filtering for higher-order features, as the hidden nodes of the CANN are traversed.

The output of node 950 may be provided as input to other nodes within ANN 800. At each respective node to which the output of node 950 is connected, the output of node 950 may be multiplied by a corresponding weighting value and summed along with other inputs to the respective node. For example, the output of node 821 may be provided to node 835. The output of node 821 may be multiplied by a weighting value associated with the connection between node 821 and 835. This product may then be summed at node 835 along with the product of the output of node 822 and the weighting value between node 822 and node 835, the product of the output of node 823 and the weighting value between node 823 and node 835, the product of the output of node 824 and the weighting value between node 824 and node 835, and the product of the output of node 825 and the weighting value between node 825 and node 835. The sum may be passed through activation function 954 to determine the output of node 835. The output of node 835 may then be provided to nodes 841 and 842 through 843.

The weighting values between interconnected nodes may be determined by training ANN 800 based on prior navigation paths and any additional data associated therewith. The prior navigation paths may include paths selected by human operators and followed by vehicles, paths selected by human operators in simulation, and autonomously generated paths. In some examples, the prior navigation paths may only be used to train ANN 800 if they resulted in successful completion of a task or navigation of a segment. The training of ANN 800 may be performed by, for example, backpropagation (e.g., classical backpropagation, backpropagation with momentum, Gauss-Jacobi backpropagation, Gauss-Seidel backpropagation, etc.).

Generally, ANN 800 may be configured to accept as input and determine navigation paths based on the type of data with which it is trained. Thus, for example, an ANN may be trained based on a plurality of previously-navigated paths, each associated with a virtual model of a target location and also associated with a package size, weather conditions at the time of delivery, and locomotive capabilities of the respective delivery vehicle performing the delivery. The ANN may then accept as input and determine a navigation path within a target location based on a virtual model of the target location, a size of the package to be delivered, current weather conditions at the target location, and locomotive capabilities of the delivery vehicle performing the delivery.

More specifically, locomotive capabilities as an input may include data representing operations that the delivery vehicle can perform based on physical construction of the delivery vehicle. The data may be available for each type of delivery vehicle available to a deploying system. For example, for a ground-based delivery vehicle, the delivery vehicle capabilities data may indicate a range of surface textures which the vehicle is capable of traversing, a maximum height difference that wheels, tracks, or legs of the vehicle are able to overcome, and a maximum height to which the delivery vehicle can lift the object. In determining the navigation path, ANN 800 may rely on data corresponding to the type of delivery vehicle selected to deliver the object to the delivery destination. Thus, by considering delivery vehicle capabilities, ANN 800 may determine navigation paths that the delivery vehicle is likely able to follow. Additionally, object dimensions and/or other properties of a package being delivered may be considered by ANN 800 to determine a navigation path that allows enough space to accommodate the object.

Notably, the trained ANN 800 may determine navigation paths within delivery destinations that it has not previously encountered or trained on. The ANN may determine navigation paths for locations that, based on the training data, are similar to the locations at which navigation paths were previously followed. For example, the ANN may determine a navigation path to allow a vehicle to circumvent a tree that has fallen in a pathway even though the vehicle has never encountered an obstacle with the exact same dimensions. Further, by training on navigation paths that have been previously designated by human users (e.g., remote teleoperators), ANN 800 may be trained to determine navigation paths that are likely similar to navigation paths that a human would select. Thus, the delivery system may autonomously select navigation paths that are likely to be successful without direct involvement of a human user.

In some examples, ANN 900 may be trained to generate a distribution of navigation paths. For instance, the ANN 900 may be a probabilistic neural network. In some examples, each output node (or subset of output nodes) may correspond to a separate navigation path and an associated probability. The probability may indicate that the navigation path is the optimal path to traverse a particular segment of a target location. In order to select a navigation path from the distribution, the navigation path with the highest associated probability may be selected. A confidence level in the navigation path may be determined based on the probability of the selected navigation path. For instance, if ANN 800 generates a navigation path with an associated probability of 99%, the confidence level may be much higher than if the navigation path with the highest associated probability generated by ANN 800 has only a 60% associated probability.

Figure 10:
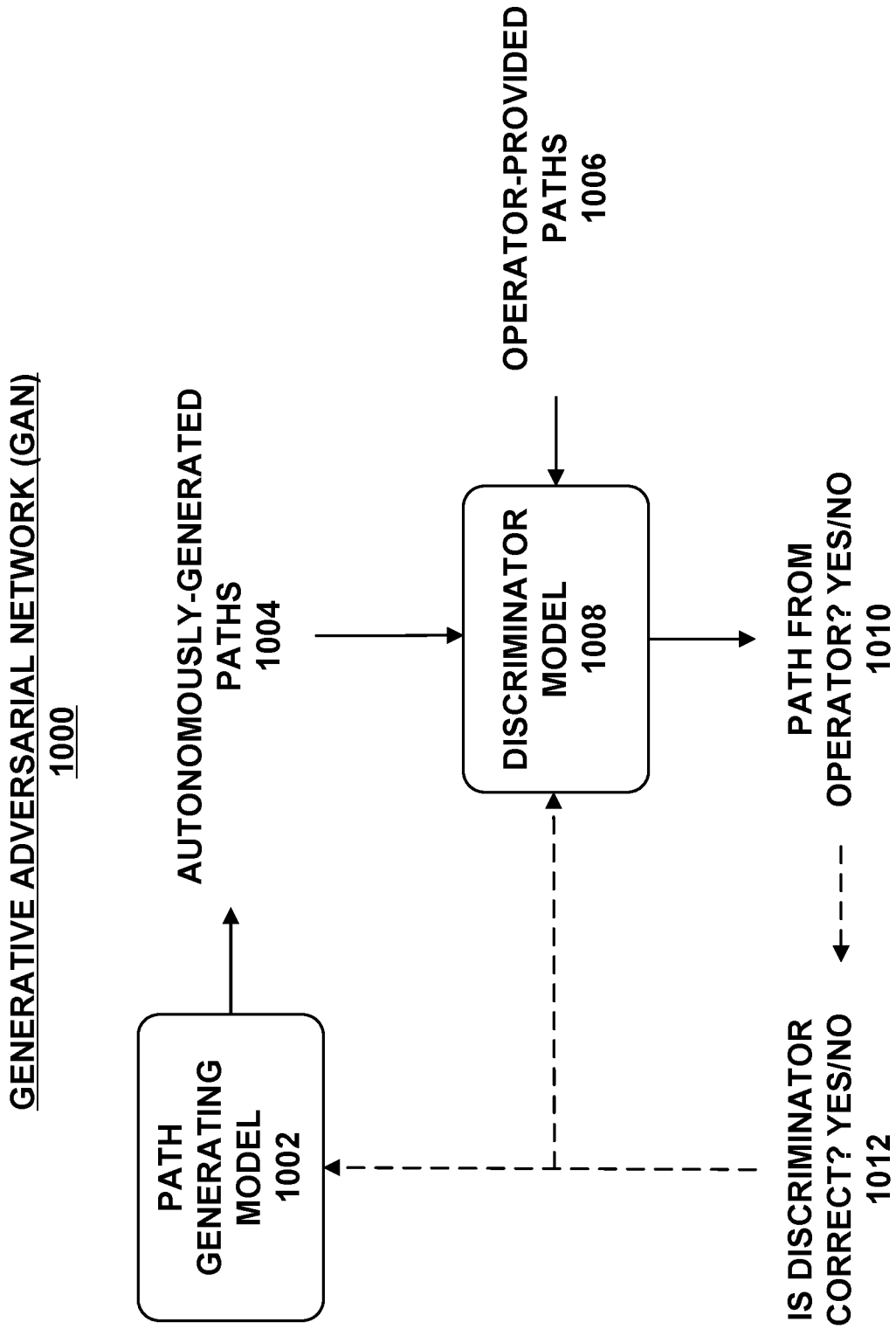
FIG. 10 illustrates an example generative adversarial network.

FIG. 10 shows an example generative adversarial network (GAN) that may be used in accordance with embodiments described herein. More specifically, the GAN 1000 may include two separate models, a path generating model 1002 and a discriminator model 1008. In some examples, the path generating model 1002 may be the ANN 800 described in reference to FIG. 8. The discriminator model 1008 may itself be a separate ANN. The discriminator model 1008 may be used to help train the path generating model 1002 to generate navigation paths that closely resemble paths selected by human operators.

The path generating model 1002 may generate autonomously-generated paths 1004 that may be fed into discriminator model 1008. Additionally, operator-provided paths 1006 may also be fed into discriminator model 1008. Discriminator model 1008 may be trained to distinguish between autonomously-generated paths 1004 and operator-provided paths 1006. More specifically, discriminator model 1008 may be trained to provide a Yes/No output 1010 indicating whether or not a given path came from a human operator. The Yes/No output 1010 may be evaluated to determine whether the path generating model 1002 successfully tricked the discriminator model 1008 with an autonomously-generated path. In particular, Yes/No signal 1012 may be generated indicating if the discriminator model 1008 correctly identified a path as being autonomously generated. Yes/No signal 1012 may be fed back into the path generating model 1002 and/or the discriminator model 1008 to further refine the model(s). Accordingly, the path generating model 1002 may be trained to learn how to trick the discriminator model 1008 into incorrectly producing an output indicating that a path was operator-provided when in fact the path came from the path generating model 1002.

Over time, the path generating model 1002 will become sufficiently well trained such that the discriminator model 1008 will be unable to distinguish an autonomously-generated navigation path from an operator-provided navigation path for a subtask or a segment of a target location. At that point, the control system may determine that the autonomously-generated navigation path is a confident path and allow the vehicle to follow the navigation path generated by the path generating model 1002 without requesting remote assistance.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A non-transitory computer-readable medium having stored therein program instructions executable by a computing system to cause the computing system to perform operations, the operations comprising:

receiving a request for a vehicle to navigate a target location;

determining a navigation path for the vehicle to traverse a first segment of the target location using an artificial neural network (ANN) trained based on a plurality of prior navigation paths previously determined for traversal of segments similar to the first segment of the target location, wherein the ANN comprises at least one of an input node configured to receive as input sensor data representing the first segment of the target location from a sensor on the vehicle, and an input node configured to receive as input one or more locomotive capabilities of the vehicle;

determining a confidence level associated with the navigation path;

based on the determined confidence level, selecting a navigation mode for the vehicle from a plurality of navigation modes corresponding to a plurality of levels of remote assistance; and causing the vehicle to traverse the first segment of the target location using a level of remote assistance corresponding to the selected navigation mode for the vehicle.

2. The computer-readable medium of claim 1, wherein determining the navigation path further comprises determining a distribution of navigation paths and associated probabilities using a probabilistic path-finding model, wherein the confidence level is further based on the distribution of navigation paths and associated probabilities.

3. The computer-readable medium of claim 1, wherein determining the navigation path comprises using a generative adversarial network (GAN), wherein the GAN comprises a path-planning model trained to generate navigation paths and a discriminator model trained to distinguish between operator-provided navigation paths and navigation paths generated by the path-planning model.

4. The computer-readable medium of claim 1, wherein the prior navigation paths comprise at least one of paths navigated by a remote operator of the vehicle, paths navigated by one or more vehicles other than the vehicle, and paths input by an operator at a user interface for simulating vehicle delivery.

5. The computer-readable medium of claim 1, wherein the operations further comprise:
   in response to determining that the confidence level is greater than a predefined confidence level threshold, selecting, as the navigation mode, autonomous control by a control system on the vehicle to traverse the first segment of the target location; and
   in response to determining that the confidence level is less than the predefined confidence level threshold, selecting, as the navigation mode, remote control of the vehicle by a remote operator to traverse the first segment of the target location.

6. The computer-readable medium of claim 1, wherein selecting the navigation mode for the vehicle includes:
   determining that the confidence level is greater than a first predefined confidence level threshold and less than a second predefined confidence level; and
   based on determining that the confidence level is greater than the first predefined confidence level threshold and less than the second predefined confidence level, selecting, as the navigation mode, autonomous control by a control system on the vehicle that follows a plurality of waypoints.

7. The computer-readable medium of claim 1, wherein the operations further comprise:
   determining a second navigation path for the vehicle to traverse a second segment of the target location;
   determining a second confidence level associated with the determined second navigation path for the vehicle to traverse the second segment of the target location;
   based on the determined second confidence level, selecting a different navigation mode for the vehicle from the plurality of navigation modes; and
   causing the vehicle to traverse the second segment of the target location using a different level of remote assistance corresponding to the selected different navigation mode for the vehicle.

8. The computer-readable medium of claim 7, wherein each of the first segment and the second segment comprise a discrete surface for the vehicle to traverse at the target location.

9. The computer-readable medium of claim 1, wherein the segments similar to the first segment of the target location have at least one of a similar topology and a same surface material as the first segment of the target location.

10. The computer-readable medium of claim 1, wherein the segments similar to the first segment of the target location comprise the first segment of the target location.

11. A non-transitory computer readable medium having stored therein program instructions executable by a computing system to cause the computing system to perform operations, the operations comprising:
   receiving a request for a vehicle to navigate to a target location;
   determining a navigation path for the vehicle to traverse a first segment of the target location using an artificial neural network (ANN) trained based on a plurality of prior navigation paths previously determined for traversal of segments similar to the first segment of the target location;
   determining a confidence level associated with the determined navigation path;
   based on the determined confidence level, selecting a navigation mode for the vehicle from a plurality of navigation modes corresponding to a plurality of levels of remote assistance; and
   causing the vehicle to traverse the first segment of the target location using a level of remote assistance corresponding to the selected navigation mode for the vehicle;
   wherein the plurality of navigation modes includes:
      autonomous control by a control system on the vehicle to traverse a series of waypoints generated or confirmed by a remote operator; and
      autonomous control by a control system on the vehicle to traverse a series of waypoints generated by the control system on the vehicle without confirmation by a remote operator.

12. The non-transitory computer readable medium of claim 11, wherein determining the navigation path comprises using a generative adversarial network (GAN), wherein the GAN comprises a path-planning model trained to generate navigation paths and a discriminator model trained to distinguish between operator-provided navigation paths and navigation paths generated by the path-planning model.

13. The non-transitory computer readable medium of claim 11, wherein the prior navigation paths comprise at least one of paths navigated by a remote operator of the vehicle, paths navigated by one or more vehicles other than the vehicle, and paths input by an operator at a user interface for simulating vehicle delivery.

14. The non-transitory computer readable medium of claim 11, wherein the operations further comprise:
   determining a second navigation path for the vehicle to traverse a second segment of the target location;
   determining a second confidence level associated with the determined second navigation path;
   based on the determined second confidence level, selecting a different navigation mode for the vehicle from the plurality of navigation modes; and
   causing the vehicle to traverse the second segment of the target location using a different level of remote assistance corresponding to the selected different navigation mode for the vehicle.

15. The non-transitory computer readable medium of claim 14, wherein each of the first segment and the second segment comprise a discrete surface for the vehicle to traverse at the target location.

16. A computer-implemented method, comprising:
   receiving, by a computing system, a request for a vehicle to navigate to a target location;
   determining, by the computing system, a navigation path for the vehicle to traverse a first segment of the target location using an artificial neural network (ANN) trained based on a plurality of prior navigation paths previously determined for traversal of segments similar to the first segment of the target location;
   determining, by the computing system, a confidence level associated with the determined navigation path;
   based on the determined confidence level, selecting, by the computing system, a navigation mode for the vehicle from a plurality of navigation modes corresponding to a plurality of levels of remote assistance; and causing, by the computing system, the vehicle to traverse the first segment of the target location using a level of remote assistance corresponding to the selected navigation mode for the vehicle;

wherein the plurality of navigation modes includes:
- autonomous control by a control system on the vehicle to traverse a series of waypoints generated or confirmed by a remote operator; and
- autonomous control by a control system on the vehicle to traverse a series of waypoints generated by the control system on the vehicle without confirmation by a remote operator.

17. The method of claim 16, wherein determining the navigation path comprises using a generative adversarial network (GAN), wherein the GAN comprises a path-planning model trained to generate navigation paths and a discriminator model trained to distinguish between operator-provided navigation paths and navigation paths generated by the path-planning model.

18. The method of claim 16, wherein the prior navigation paths comprise at least one of paths navigated by a remote operator of the vehicle, paths navigated by one or more vehicles other than the vehicle, and paths input by an operator at a user interface for simulating vehicle delivery.

19. The method of claim 16, further comprising:
- determining a second navigation path for the vehicle to traverse a second segment of the target location;
- determining a second confidence level associated with the determined second navigation path;
- based on the determined second confidence level, selecting a different navigation mode for the vehicle from the plurality of navigation modes; and
- causing the vehicle to traverse the second segment of the target location using a different level of remote assistance corresponding to the selected different navigation mode for the vehicle.

20. The method of claim 19, wherein each of the first segment and the second segment comprise a discrete surface for the vehicle to traverse at the target location.

* * * * *